United States Patent
Lee et al.

(10) Patent No.: US 12,289,599 B2
(45) Date of Patent: Apr. 29, 2025

(54) WIRELESS POWER TRANSMISSION APPARATUS AND WIRELESS POWER RECEPTION APPARATUS FOR TRANSFERRING AND RECEIVING WIRELESS POWER

(71) Applicant: LG ELECTRONICS INC., Seoul (KR)

(72) Inventors: Minsoo Lee, Seoul (KR); Jingu Choi, Seoul (KR); Gyunghwan Yook, Seoul (KR); Seunghyun Yoo, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 18/025,161

(22) PCT Filed: Sep. 8, 2020

(86) PCT No.: PCT/KR2020/012115
§ 371 (c)(1),
(2) Date: Mar. 7, 2023

(87) PCT Pub. No.: WO2022/054973
PCT Pub. Date: Mar. 17, 2022

(65) Prior Publication Data
US 2023/0319562 A1 Oct. 5, 2023

(51) Int. Cl.
*H02J 50/80* (2016.01)
*H04B 5/70* (2024.01)
(Continued)

(52) U.S. Cl.
CPC ........... *H04W 12/069* (2021.01); *H02J 50/80* (2016.02); *H04B 5/70* (2024.01); *H04W 12/50* (2021.01); *H02J 50/12* (2016.02)

(58) Field of Classification Search
CPC .............. H02J 50/80; H04B 5/72; H04B 5/79
See application file for complete search history.

(56) References Cited

U.S. PATENT DOCUMENTS

| | | | |
|---|---|---|---|
| 8,711,656 B1 * | 4/2014 | Paulson | H04L 27/10 367/135 |
| 9,407,106 B2 * | 8/2016 | Redding | H02J 7/00047 |

(Continued)

FOREIGN PATENT DOCUMENTS

| | | |
|---|---|---|
| KR | 10-2015-0011448 A | 2/2015 |
| KR | 10-2016-0139550 A | 12/2016 |

(Continued)

OTHER PUBLICATIONS

DMTF, "Security Protocol and Data Model (SPDM) Architecture"), PMCI Security Task Force, Apr. 3, 2019, all pages (Year: 2019).*

*Primary Examiner* — Adi Amrany
(74) *Attorney, Agent, or Firm* — BRYAN CAVE LEIGHTON PAISNER LLP

(57) ABSTRACT

A wireless power transmission apparatus for transmitting wireless power to a wireless power reception apparatus, according to an embodiment of the present specification: transmits wireless power to the wireless power reception apparatus by means of magnetic coupling to the wireless power reception apparatus at an operating frequency; communicates with the wireless power reception apparatus by using at least one of in-band communication using the operating frequency and out-band communication using BLUETOOTH® communication; performs an authentication step with the wireless power reception apparatus to increase the level of the wireless power being transmitted to the wireless power reception apparatus; and includes, in a BLUETOOTH® packet, an authentication message required in the authentication step, and transmits the included authen- (Continued)

tication message to the wireless power reception apparatus via the BLUETOOTH® communication.

6 Claims, 41 Drawing Sheets

(51) Int. Cl.
*H04W 12/069* (2021.01)
*H04W 12/50* (2021.01)
*H02J 50/12* (2016.01)

(56) References Cited

U.S. PATENT DOCUMENTS

| | | | |
|---|---|---|---|
| 2016/0050563 A1 | 2/2016 | Bronk | |
| 2017/0237301 A1* | 8/2017 | Elad | H02J 7/00034 |
| | | | 307/104 |
| 2019/0044393 A1* | 2/2019 | Louis | H04B 5/79 |
| 2019/0296799 A1* | 9/2019 | Park | H02J 50/402 |
| 2019/0312462 A1* | 10/2019 | Shichino | H02J 50/80 |
| 2020/0044694 A1* | 2/2020 | Park | H04B 5/79 |
| 2020/0267553 A1* | 8/2020 | Wagner | G06F 21/32 |
| 2020/0366136 A1* | 11/2020 | Tachiwa | H02J 50/90 |
| 2021/0184512 A1* | 6/2021 | Hiramatsu | H02J 50/10 |
| 2021/0242725 A1* | 8/2021 | Tachiwa | H02J 50/80 |
| 2021/0248223 A1* | 8/2021 | Chippakurthy | G06F 9/541 |
| 2021/0367974 A1* | 11/2021 | Ponnuru | H04L 63/20 |
| 2023/0052957 A1* | 2/2023 | Lee | H04W 4/80 |
| 2024/0048979 A1* | 2/2024 | Lee | H04W 4/029 |

FOREIGN PATENT DOCUMENTS

| | | |
|---|---|---|
| KR | 10-2136453 B1 | 7/2020 |
| KR | 10-2020-0101010 A | 8/2020 |

* cited by examiner

FIG. 3b

|  | b7 | b6 | b5 | b4 | b3 | b2 | b1 | b0 |
|---|---|---|---|---|---|---|---|---|
| Byte 0 | Application Profile ||||||||
| Byte 1 | Version ||||||||
| Byte 2-N-1 | Profile-specific data ||||||||

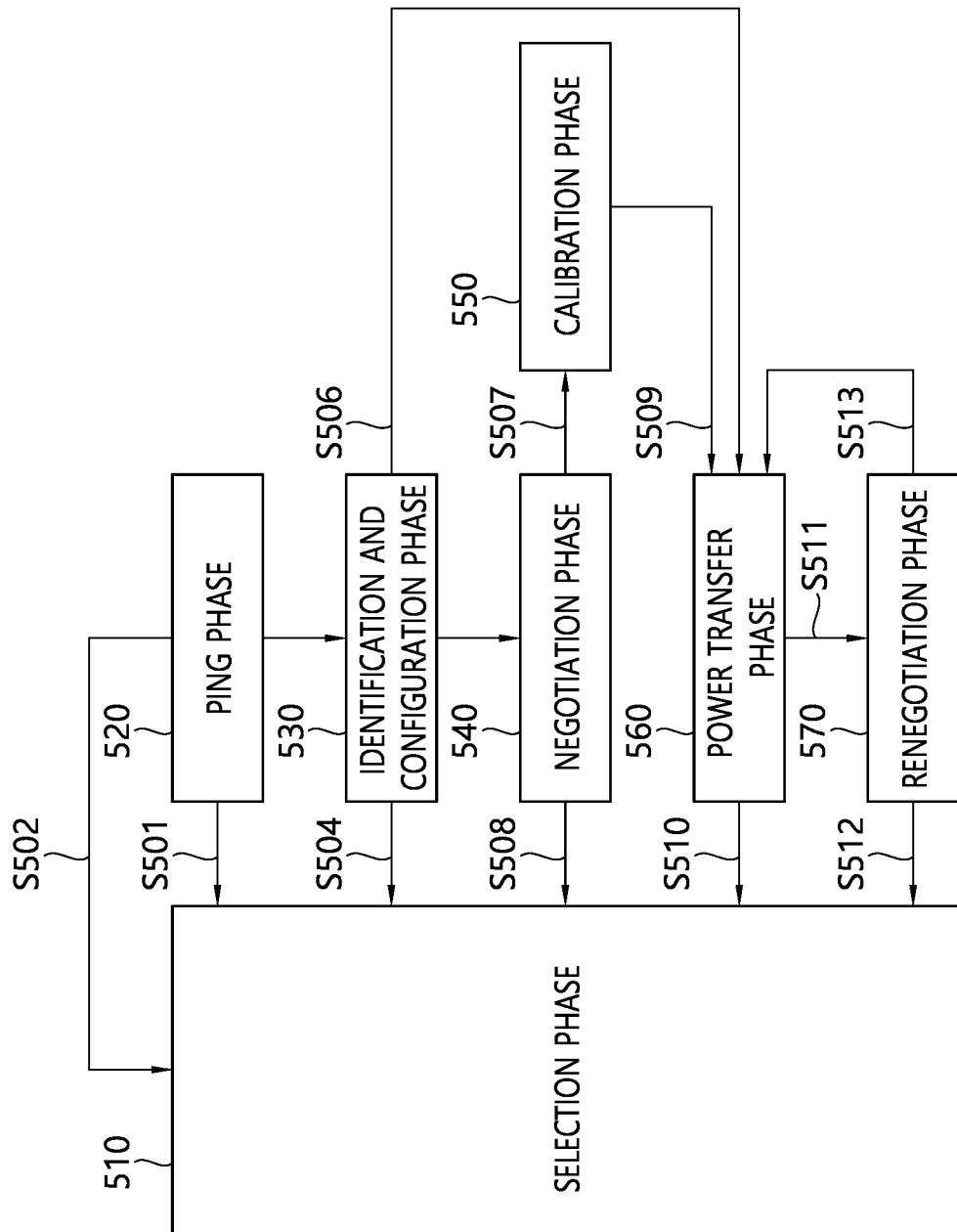

FIG. 10

| Preamble | ZERO | Response | Type | Info | Parity |
|---|---|---|---|---|---|

Response
'00' : no comms
'01' : comms error
'10' : NAK
'11' : ACK

Type
ZERO : slot sync
ONE : frame sync

Parity : odd

Info (Type is ZERO)
'00' : allocated
'01' : locked
'10' : free
'11' : reserved

Info (Type is ONE)
'00' : slotted
'01' : frees format
'10' : reserved
'11' : reserved

FIG. 12

| | b7 | b6 | b5 | b4 | b3 | b2 | b1 | b0 |
|---|---|---|---|---|---|---|---|---|
| B0 | \multicolumn{8}{l}{Certificate Structure Version} | | | | | | | |
| B1 | | | Reserved | | | | Certificate Type | |
| B2 | \multicolumn{8}{l}{Signature Offset} | | | | | | | |
| B3 ... B11 | MSB | | | | | | | LSB |
| | \multicolumn{8}{l}{Serial Number} | | | | | | | |
| B12 ... B17 | \multicolumn{8}{l}{Issuer ID} | | | | | | | |
| B18 ... B23 | \multicolumn{8}{l}{Subject ID} | | | | | | | |
| B24 ... B56 | \multicolumn{8}{l}{Public Key} | | | | | | | |
| — | \multicolumn{8}{l}{Future extensions may have additional field in this area} | | | | | | | |
| B signature_offset ... B signature_offset+63 | \multicolumn{8}{l}{Signature} | | | | | | | |

FIG. 13

|   | $b_7$ | $b_6$ | $b_5$ | $b_4$ | $b_3$ | $b_2$ | $b_1$ | $b_0$ |
|---|---|---|---|---|---|---|---|---|
| $B_0$ | Power Class | | Guaranteed Power Value | | | | | |
| $B_1$ | Reserved | | | Potential Power Value | | | | |
| $B_2$ | AI | AR | OB | Reserved | | | WPID | Not Res Sens |

FIG. 14

|   | b7 | b6 | b5 | b4 | b3 | b2 | b1 | b0 |
|---|---|---|---|---|---|---|---|---|
| B0 | Power Class | | Maximum Power value | | | | | |
| B1 | Reserved | | | | | | | |
| B2 | Prop | AI | AR | OB | ZERO | Count | | |
| B3 | Window Size | | | | | Window Offset | | |
| B4 | Neg | Polarity* | Depth* | | Reserved | | | |

FIG. 18

| | b7 | b6 | b5 | b4 | b3 | b2 | b1 | b0 |
|---|---|---|---|---|---|---|---|---|
| B0 | Authentication Message Header ||||||||
| B1 | Reserved ||| Reserved | Slot Mask ||||

FIG. 19

|  | b₇ | b₆ | b₅ | b₄ | b₃ | b₂ | b₁ | b₀ |
|---|---|---|---|---|---|---|---|---|
| B₀ | Authentication Message Header ||||||||
| B₁ | Offset 98 |||| Length 98 |||| |
| B₂ | Offset 70 |||| Reserved | Reserved | Slot Number ||
| B₃ | Length 70 |||||||| |

FIG. 20

| | b7 | b6 | b5 | b4 | b3 | b2 | b1 | b0 |
|---|---|---|---|---|---|---|---|---|
| B0 | Authentication Message Header ||||||||
| B1 | Reserved |||||| Reserved | Slot Number |
| B2···B17 | Nonce ||||||||

FIG. 21

| | $b_7$ | $b_6$ | $b_5$ | $b_4$ | $b_3$ | $b_2$ | $b_1$ | $b_0$ |
|---|---|---|---|---|---|---|---|---|
| $B_0$ | Authentication Message Header ||||||||
| $B_1$ | Slots Populated Mask |||| Slots Returned Mask ||||
| $B_2 + 32 \times (n-1)$ ... $B_{33} + 32 \times (n-1)$ | Digests Returned ||||||||

FIG. 22

| | b7 | b6 | b5 | b4 | b3 | b2 | b1 | b0 |
|---|---|---|---|---|---|---|---|---|
| B0 | | | | Authentication Message Header | | | | |
| B1 ... B(1 + length - 1) | | | | Certificated Chain Segment | | | | |

FIG. 23

| | b7 | b6 | b5 | b4 | b3 | b2 | b1 | b0 |
|---|---|---|---|---|---|---|---|---|
| B0 | Authentication Message Header ||||||||
| B1 | Maximum Authentication Protocol Version |||| Slots Populated Mask ||||
| B2 | Certificated Chain Hash LSB ||||||||
| B3···B34 | msb Signature r value lsb ||||||||
| B35···B66 | msb Signature s value lsb ||||||||

FIG. 24

| | b7 | b6 | b5 | b4 | b3 | b2 | b1 | b0 |
|---|---|---|---|---|---|---|---|---|
| B0 | Authentication Message Header ||||||||
| B1 | Error Code ||||||||
| B2 | Error Data ||||||||

FIG. 25

| $b_0$ | $b_1$ | $b_2$ | $b_3$ | $b_4$ | $b_5$ | $b_6$ | $b_7$ | $B_0$ |
|---|---|---|---|---|---|---|---|---|
| Message Type | | | | Authentication Protocol Version | | | | |

FIG. 26

| Name | Value | Meaning |
|---|---|---|
| Reserved | 0x0 | Reserved value |
| V1.0 | 0x1 | Authentication Protocol Version 1.0 |
| Reserved | 0x2 - 0xF | Reserved value |

FIG. 27

| Value | Description |
|---|---|
| 0x0 - 0x7 | Used for Authentication responses |
| 0x8 | Reserved |
| 0x9 | GET_DIGESTS |
| 0xA | GET_CERTIFICATE |
| 0xB | CHALLENGE |
| 0xD ... 0xF | Reserved |

FIG. 28

| Value | Description |
|---|---|
| 0x0 | Reserved |
| 0x1 | DIGESTS |
| 0x2 | CERTIFICATE |
| 0x3 | CHALLENGE_AUTH |
| 0x4 ... 0x6 | Reserved |
| 0x7 | ERROR |
| 0x8 ... 0xF | Used for Authentication requests |

WIRELESS POWER TRANSMISSION APPARATUS AND WIRELESS POWER RECEPTION APPARATUS FOR TRANSFERRING AND RECEIVING WIRELESS POWER

CROSS-REFERENCE TO RELATED APPLICATIONS

This application is the National Stage filing under 35 U.S.C. 371 of International Application No. PCT/KR2020/012115, filed on Sep. 8, 2020 which is hereby incorporated by reference herein in its entirety.

BACKGROUND OF THE DISCLOSURE

Field of the Disclosure

The present specification relates to a wireless power transmitter and a wireless power receiver for receiving wireless power from the wireless power transmitter.

Related Art

The wireless power transfer (or transmission) technology corresponds to a technology that may wirelessly transfer (or transmit) power between a power source and an electronic device. For example, by allowing the battery of a wireless device, such as a smartphone or a tablet PC, and so on, to be recharged by simply loading the wireless device on a wireless charging pad, the wireless power transfer technique may provide more outstanding mobility, convenience, and safety as compared to the conventional wired charging environment, which uses a wired charging connector. Apart from the wireless charging of wireless devices, the wireless power transfer technique is raising attention as a replacement for the conventional wired power transfer environment in diverse fields, such as electric vehicles, BLUETOOTH® earphones, 3D glasses, diverse wearable devices, household (or home) electric appliances, furniture, underground facilities, buildings, medical equipment, robots, leisure, and so on.

The wireless power transfer (or transmission) method is also referred to as a contactless power transfer method, or a no point of contact power transfer method, or a wireless charging method. A wireless power transfer system may be configured of a wireless power transmitter supplying electric energy by using a wireless power transfer method, and a wireless power receiver receiving the electric energy being supplied by the wireless power transmitter and supplying the receiving electric energy to a receiver, such as a battery cell, and so on.

The wireless power transfer technique includes diverse methods, such as a method of transferring power by using magnetic coupling, a method of transferring power by using radio frequency (RF), a method of transferring power by using microwaves, and a method of transferring power by using ultrasound (or ultrasonic waves). The method that is based on magnetic coupling is categorized as a magnetic induction method and a magnetic resonance method. The magnetic induction method corresponds to a method transmitting power by using electric currents that are induced to the coil of the receiver by a magnetic field, which is generated from a coil battery cell of the transmitter, in accordance with an electromagnetic coupling between a transmitting coil and a receiving coil. The magnetic resonance method is similar to the magnetic induction method in that is uses a magnetic field. However, the magnetic resonance method is different from the magnetic induction method in that energy is transmitted due to a concentration of magnetic fields on both a transmitting end and a receiving end, which is caused by the generated resonance.

SUMMARY OF THE DISCLOSURE

A technical problem of the present specification is to provide a wireless power transmission device, a wireless power transmission method, a wireless power reception device, a wireless power reception method, and a wireless charging system that perform an authentication phase through out-of-band communication.

The technical problems of the present specification are not limited to the problems mentioned above, and other problems not mentioned will be clearly understood by those skilled in the art from the following description.

According to an embodiment of the present specification for solving the above problems, a wireless power transmitter is related to transferring wireless power to a wireless power receiver and is configured to transmit the wireless power to the wireless power receiver by magnetic coupling with the wireless power receiver at an operating frequency, communicate with the wireless power receiver using at least one of in-band communication using the operating frequency and out-band communication using BLUETOOTH® communication, and perform an authentication phase with the wireless power receiver to increase a level of the wireless power transmitted to the wireless power receiver, wherein an authentication message required in the authentication phase is included in a BLUETOOTH® packet and transmitted to the wireless power receiver through the BLUETOOTH® communication.

According to an embodiment of the present specification for solving the above problems, a wireless power receiver is related to receiving wireless power from a wireless power transmitter and is configured to receive the wireless power from the wireless power transmitter by magnetic coupling with the wireless power transmitter at an operating frequency, communicate with the wireless power transmitter using at least one of in-band communication using the operating frequency and out-band communication using BLUETOOTH® communication, perform an authentication phase with the wireless power transmitter to increase the wireless power received from the wireless power transmitter to a higher level, wherein the authentication message required in the authentication phase is included in a BLUETOOTH® packet and transmitted to the wireless power transmitter through the BLUETOOTH® communication.

Other specific details of this specification are included in the detailed description and drawings.

Since the wireless power receiver and the wireless power transmitter transmit/receive the authentication message required in the authentication phase through out-of-band communication, the authentication phase can be completed more quickly.

Effects according to this specification are not limited by the contents exemplified above, and various more effects are included in this specification.

BRIEF DESCRIPTION OF THE DRAWINGS

FIG. 3b shows an example of a WPC NDEF in a wireless power transfer system.

FIG. 5 is a state transition diagram for describing a wireless power transfer procedure.

FIG. 10 is a structure of a sync pattern according to an exemplary embodiment.

FIG. 12 is a block diagram illustrating a wireless charging certificate format according to an embodiment.

FIG. 13 is a capability packet structure of a wireless power transmitter according to an embodiment.

FIG. 14 is a configuration packet structure of a wireless power receiver according to an embodiment.

FIG. 18 is a diagram illustrating a GET_DIGESTS format.

FIG. 19 is a diagram illustrating a GET_CERTIFICATE format.

FIG. 20 is a diagram illustrating a CHALLENGE format.

FIG. 21 is a diagram showing a DIGESTS format.

FIG. 22 is a diagram illustrating a CERTIFICATE format.

FIG. 23 is a diagram illustrating a CHALLENGE_AUTH format.

FIG. 24 is a diagram illustrating an ERROR format.

FIG. 25 is a diagram showing the format of an Authentication message header.

FIG. 26 is a table showing explanations on the value and meaning of the Authentication Protocol Version field of the Authentication message header.

FIG. 27 is a table showing descriptions of the Message Type field of the Authentication message header of the authentication request message.

FIG. 28 is a table illustrating descriptions of the Message Type field of the Authentication message header of the authentication response message.

DESCRIPTION OF EXEMPLARY EMBODIMENTS

In this specification, "A or B" may refer to "only A", "only B" or "both A and B". In other words, "A or B" in this specification may be interpreted as "A and/or B". For example, in this specification, "A, B, or C" may refer to "only A", "only B", "only C", or any combination of "A, B and C".

The slash (/) or comma used in this specification may refer to "and/or". For example, "A/B" may refer to "A and/or B". Accordingly, "A/B" may refer to "only A", "only B", or "both A and B". For example, "A, B, C" may refer to "A, B, or C".

In this specification, "at least one of A and B" may refer to "only A", "only B", or "both A and B". In addition, in this specification, the expression of "at least one of A or B" or "at least one of A and/or B" may be interpreted to be the same as "at least one of A and B".

Also, in this specification, "at least one of A, B and C" may refer to "only A", "only B", "only C", or "any combination of A, B and C". Also, "at least one of A, B or C" or "at least one of A, B and/or C" may refer to "at least one of A, B and C".

In addition, parentheses used in the present specification may refer to "for example". Specifically, when indicated as "control information (PDCCH)", "PDCCH" may be proposed as an example of "control information". In other words, "control information" in this specification is not limited to "PDCCH", and "PDCCH" may be proposed as an example of "control information". In addition, even when indicated as "control information (i.e., PDCCH)", "PDCCH" may be proposed as an example of "control information".

In the present specification, technical features that are individually described in one drawing may be individually or simultaneously implemented.

The term "wireless power", which will hereinafter be used in this specification, will be used to refer to an arbitrary form of energy that is related to an electric field, a magnetic field, and an electromagnetic field, which is transferred (or transmitted) from a wireless power transmitter to a wireless power receiver without using any physical electromagnetic conductors. The wireless power may also be referred to as a wireless power signal, and this may refer to an oscillating magnetic flux that is enclosed by a primary coil and a secondary coil. For example, power conversion for wirelessly charging devices including mobile phones, cordless phones, iPods, MP3 players, headsets, and so on, within the system will be described in this specification. Generally, the basic principle of the wireless power transfer technique includes, for example, all of a method of transferring power by using magnetic coupling, a method of transferring power by using radio frequency (RF), a method of transferring power by using microwaves, and a method of transferring power by using ultrasound (or ultrasonic waves).

Figure 1:
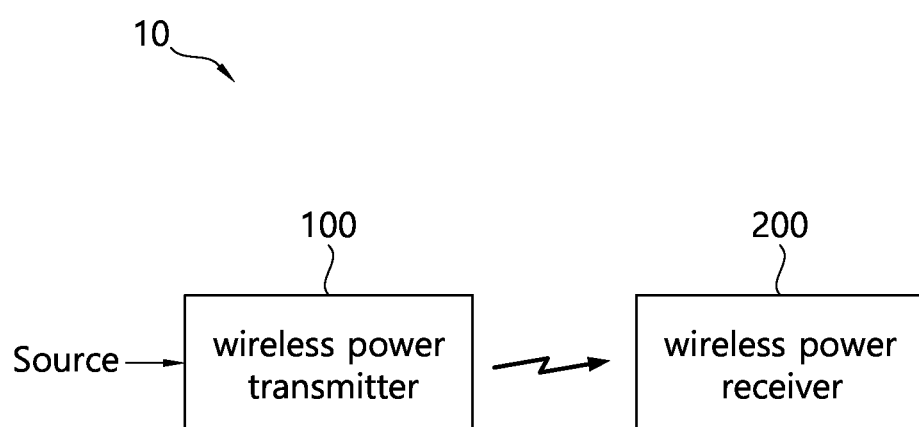
FIG. 1 is a block diagram of a wireless power system (10) according to an exemplary embodiment of the present disclosure.

FIG. 1 is a block diagram of a wireless power system (10) according to an exemplary embodiment of the present disclosure.

Referring to FIG. 1, the wireless power system (10) include a wireless power transmitter (100) and a wireless power receiver (200).

The wireless power transmitter (100) is supplied with power from an external power source(S) and generates a magnetic field. The wireless power receiver (200) generates electric currents by using the generated magnetic field, thereby being capable of wirelessly receiving power.

Additionally, in the wireless power system (10), the wireless power transmitter (100) and the wireless power receiver (200) may transceive (transmit and/or receive) diverse information that is required for the wireless power transfer. Herein, communication between the wireless power transmitter (100) and the wireless power receiver (200) may be performed (or established) in accordance with any one of an in-band communication, which uses a magnetic field that is used for the wireless power transfer (or transmission), and an out-band communication, which uses a separate communication carrier. Out-band communication may also be referred to as out-of-band communication. Hereinafter, out-band communication will be largely described. Examples of out-band communication may include NFC, BLUETOOTH®, BLUETOOTH® low energy (BLE), and the like.

Herein, the wireless power transmitter (100) may be provided as a fixed type or a mobile (or portable) type. Examples of the fixed transmitter type may include an embedded type, which is embedded in in-door ceilings or wall surfaces or embedded in furniture, such as tables, an implanted type, which is installed in out-door parking lots, bus stops, subway stations, and so on, or being installed in means of transportation, such as vehicles or trains. The mobile (or portable) type wireless power transmitter (100) may be implemented as a part of another device, such as a mobile device having a portable size or weight or a cover of a laptop computer, and so on.

Additionally, the wireless power receiver (200) should be interpreted as a comprehensive concept including diverse home appliances and devices that are operated by being wirelessly supplied with power instead of diverse electronic devices being equipped with a battery and a power cable. Typical examples of the wireless power receiver (200) may include portable terminals, cellular phones, smartphones, personal digital assistants (PDAs), portable media players (PDPs), Wibro terminals, tablet PCs, phablet, laptop computers, digital cameras, navigation terminals, television, electronic vehicles (EVs), and so on.

Figure 2:
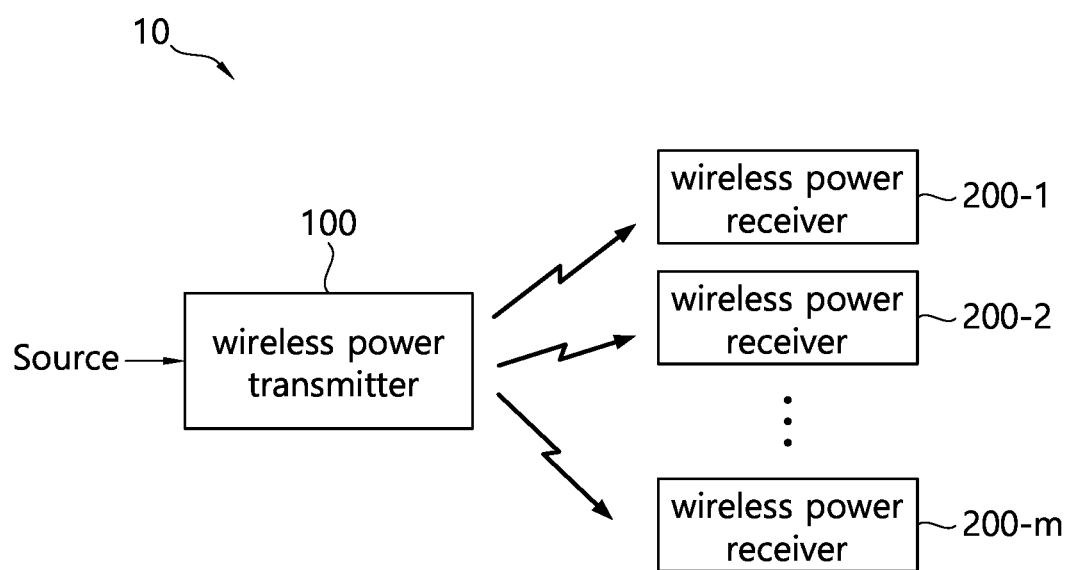
FIG. 2 is a block diagram of a wireless power system (10) according to another exemplary embodiment of the present disclosure.

FIG. 2 is a block diagram of a wireless power system (10) according to another exemplary embodiment of the present disclosure.

Referring to FIG. 2, in the wireless power system (10), one wireless power receiver (200) or a plurality of wireless power receivers may exist. Although it is shown in FIG. 1 that the wireless power transmitter (100) and the wireless power receiver (200) send and receive power to and from one another in a one-to-one correspondence (or relationship), as shown in FIG. 2, it is also possible for one wireless power transmitter (100) to simultaneously transfer power to multiple wireless power receivers (200-1, 200-2, . . . , 200-M). Most particularly, in case the wireless power transfer (or transmission) is performed by using a magnetic resonance method, one wireless power transmitter (100) may transfer power to multiple wireless power receivers (200-1, 200-2, . . . , 200-M) by using a synchronized transport (or transfer) method or a time-division transport (or transfer) method.

Additionally, although it is shown in FIG. 1 that the wireless power transmitter (100) directly transfers (or transmits) power to the wireless power receiver (200), the wireless power system (10) may also be equipped with a separate wireless power transceiver, such as a relay or repeater, for increasing a wireless power transport distance between the wireless power transmitter (100) and the wireless power receiver (200). In this case, power is delivered to the wireless power transceiver from the wireless power transmitter (100), and, then, the wireless power transceiver may transfer the received power to the wireless power receiver (200).

Hereinafter, the terms wireless power receiver, power receiver, and receiver, which are mentioned in this specification, will refer to the wireless power receiver (200). Also, the terms wireless power transmitter, power transmitter, and transmitter, which are mentioned in this specification, will refer to the wireless power transmitter (100).

Figure 3A:
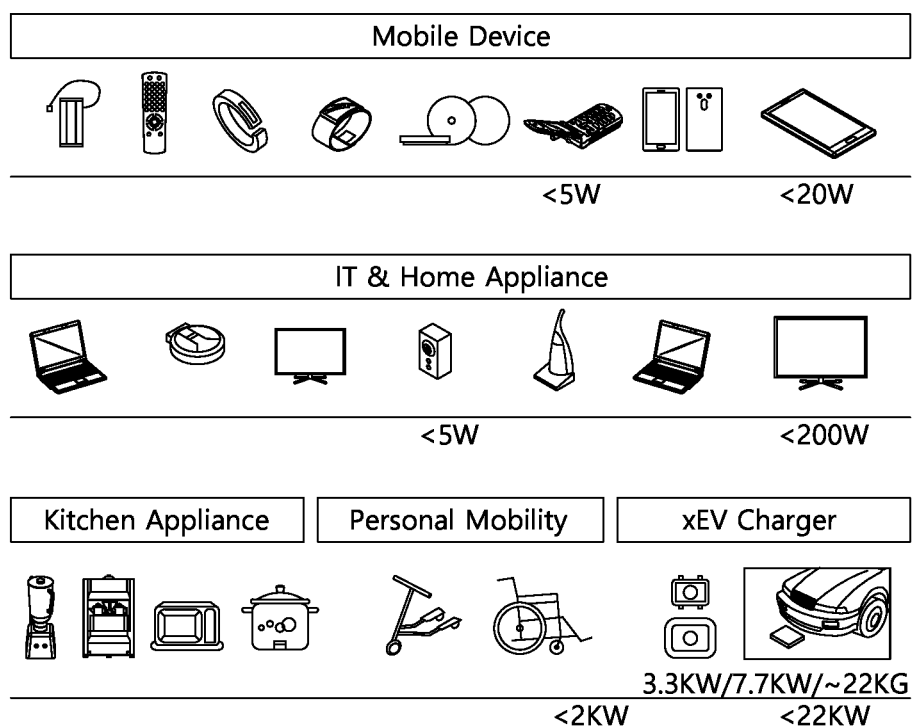
FIG. 3a shows an exemplary embodiment of diverse electronic devices adopting a wireless power transfer system.

FIG. 3a shows an exemplary embodiment of diverse electronic devices adopting a wireless power transfer system.

As shown in FIG. 3a, the electronic devices included in the wireless power transfer system are sorted in accordance with the amount of transmitted power and the amount of received power. Referring to FIG. 3, wearable devices, such as smart watches, smart glasses, head mounted displays (HMDs), smart rings, and so on, and mobile electronic devices (or portable electronic devices), such as earphones, remote controllers, smartphones, PDAs, tablet PCs, and so on, may adopt a low-power (approximately 5 W or less or approximately 20 W or less) wireless charging method.

Small-sized/Mid-sized electronic devices, such as laptop computers, robot vacuum cleaners, TV receivers, audio devices, vacuum cleaners, monitors, and so on, may adopt a mid-power (approximately 50 W or less or approximately 200 W or less) wireless charging method. Kitchen appliances, such as mixers, microwave ovens, electric rice cookers, and so on, and personal transportation devices (or other electric devices or means of transportation), such as powered wheelchairs, powered kick scooters, powered bicycles, electric cars, and so on may adopt a high-power (approximately 2 kW or less or approximately 22 kW or less) wireless charging method.

The electric devices or means of transportation, which are described above (or shown in FIG. 1) may each include a wireless power receiver, which will hereinafter be described in detail. Therefore, the above-described electric devices or means of transportation may be charged (or re-charged) by wirelessly receiving power from a wireless power transmitter.

Hereinafter, although the present disclosure will be described based on a mobile device adopting the wireless power charging method, this is merely exemplary. And, therefore, it shall be understood that the wireless charging method according to the present disclosure may be applied to diverse electronic devices.

A standard for the wireless power transfer (or transmission) includes a wireless power consortium (WPC), an air fuel alliance (AFA), and a power matters alliance (PMA).

The WPC standard defines a baseline power profile (BPP) and an extended power profile (EPP). The BPP is related to a wireless power transmitter and a wireless power receiver supporting a power transfer of 5 W, and the EPP is related to a wireless power transmitter and a wireless power receiver supporting the transfer of a power range greater than 5 W and less than 30 W.

Diverse wireless power transmitters and wireless power receivers each using a different power level may be covered by each standard and may be sorted by different power classes or categories.

For example, the WPC may categorize (or sort) the wireless power transmitters and the wireless power receivers as PC-1, PC0, PC1, and PC2, and the WPC may provide a standard document (or specification) for each power class (PC). The PC-1 standard relates to wireless power transmitters and receivers providing a guaranteed power of less than 5 W. The application of PC-1 includes wearable devices, such as smart watches.

The PC0 standard relates to wireless power transmitters and receivers providing a guaranteed power of 5 W. The PC0 standard includes an EPP having a guaranteed power ranges that extends to 30 W. Although in-band (IB) communication corresponds to a mandatory communication protocol of PC0, out-of-band (OB) communication that is used as an optional backup channel may also be used for PC0. The wireless power receiver may be identified by setting up an OB flag, which indicates whether or not the OB is supported, within a configuration packet. A wireless power transmitter supporting the OB may enter an OB handover phase by transmitting a bit-pattern for an OB handover as a response to the configuration packet. The response to the configuration packet may correspond to an NAK, an ND, or an 8-bit pattern that is newly defined. The application of the PC0 includes smartphones.

The PC1 standard relates to wireless power transmitters and receivers providing a guaranteed power ranging from 30 W to 150 W. OB corresponds to a mandatory communication channel for PC1, and IB is used for initialization and link establishment to OB. The wireless power transmitter may enter an OB handover phase by transmitting a bit-pattern for an OB handover as a response to the configuration packet. The application of the PC1 includes laptop computers or power tools.

The PC2 standard relates to wireless power transmitters and receivers providing a guaranteed power ranging from 200 W to 2 kW, and its application includes kitchen appliances.

As described above, the PCs may be differentiated in accordance with the respective power levels. And, information on whether or not the compatibility between the same PCs is supported may be optional or mandatory. Herein, the compatibility between the same PCs indicates that power transfer/reception between the same PCs is possible. For example, in case a wireless power transmitter corresponding to PC x is capable of performing charging of a wireless power receiver having the same PC x, it may be understood that compatibility is maintained between the same PCs. Similarly, compatibility between different PCs may also be supported. Herein, the compatibility between different PCs indicates that power transfer/reception between different PCs is also possible. For example, in case a wireless power transmitter corresponding to PC x is capable of performing charging of a wireless power receiver having PC y, it may be understood that compatibility is maintained between the different PCs.

The support of compatibility between PCs corresponds to an extremely important issue in the aspect of user experience and establishment of infrastructure. Herein, however, diverse problems, which will be described below, exist in maintaining the compatibility between PCs.

In case of the compatibility between the same PCs, for example, in case of a wireless power receiver using a lap-top charging method, wherein stable charging is possible only when power is continuously transferred, even if its respective wireless power transmitter has the same PC, it may be difficult for the corresponding wireless power receiver to stably receive power from a wireless power transmitter of the power tool method, which transfers power non-continuously. Additionally, in case of the compatibility between different PCs, for example, in case a wireless power transmitter having a minimum guaranteed power of 200 W transfers power to a wireless power receiver having a maximum guaranteed power of 5 W, the corresponding wireless power receiver may be damaged due to an over-voltage. As a result, it may be inappropriate (or difficult) to use the PS as an index/reference standard representing/indicating the compatibility.

Wireless power transmitters and receivers may provide a very convenient user experience and interface (UX/UI). That is, a smart wireless charging service may be provided, and the smart wireless charging service may be implemented based on a UX/UI of a smartphone including a wireless power transmitter. For these applications, an interface between a processor of a smartphone and a wireless charging receiver allows for "drop and play" two-way communication between the wireless power transmitter and the wireless power receiver.

As an example, a user may experience a smart wireless charging service in a hotel. When the user enters a hotel room and puts a smartphone on a wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when it is detected that wireless power is received, or when the smartphone receives information on the smart wireless charging service from the wireless charger, the smartphone enters a state of inquiring the user about agreement (opt-in) of supplemental features. To this end, the smartphone may display a message on a screen in a manner with or without an alarm sound. An example of the message may include the phrase "Welcome to ###hotel. Select" Yes" to activate smart charging functions: Yes| No Thanks." The smartphone receives an input from the user who selects Yes or No Thanks, and performs a next procedure selected by the user. If Yes is selected, the smartphone transmits corresponding information to the wireless charger. The smartphone and the wireless charger perform the smart charging function together.

The smart wireless charging service may also include receiving WiFi credentials auto-filled. For example, the wireless charger transmits the WiFi credentials to the smartphone, and the smartphone automatically inputs the WiFi credentials received from the wireless charger by running an appropriate application.

The smart wireless charging service may also include running a hotel application that provides hotel promotions or obtaining remote check-in/check-out and contact information.

As another example, the user may experience the smart wireless charging service in a vehicle. When the user gets in the vehicle and puts the smartphone on the wireless charger, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about checking identity.

In this state, the smartphone is automatically connected to the vehicle via WiFi and/or BLUETOOTH®. The smartphone may display a message on the screen in a manner with or without an alarm sound. An example of the message may include a phrase of "Welcome to your car. Select "Yes" to synch device with in-car controls: Yes|No Thanks." Upon receiving the user's input to select Yes or No Thanks, the smartphone performs a next procedure selected by the user. If Yes is selected, the smartphone transmits corresponding information to the wireless charger. In addition, the smartphone and the wireless charger may run an in-vehicle smart control function together by driving in-vehicle application/display software. The user may enjoy the desired music and check a regular map location. The in-vehicle applications/display software may include an ability to provide synchronous access for passers-by.

As another example, the user may experience smart wireless charging at home. When the user enters the room and puts the smartphone on the wireless charger in the room, the wireless charger transmits wireless power to the smartphone and the smartphone receives wireless power. In this process, the wireless charger transmits information on the smart wireless charging service to the smartphone. When it is detected that the smartphone is located on the wireless charger, when wireless power is detected to be received, or when the smartphone receives information on the smart wireless charging service from the wireless charger, the smartphone enters a state of inquiring the user about agreement (opt-in) of supplemental features. To this end, the smartphone may display a message on the screen in a manner with or without an alarm sound. An example of the message may include a phrase such as "Hi xxx, Would you like to activate night mode and secure the building?: Yes|No Thanks." The smartphone receives a user input to select Yes or No Thanks and performs a next procedure selected by the user. If Yes is selected, the smartphone transmits corresponding information to the wireless charger. The smartphones and the wireless charger may recognize at least user's pattern and recommend the user to lock doors and windows, turn off lights, or set an alarm.

Hereinafter, 'profiles' will be newly defined based on indexes/reference standards representing/indicating the compatibility. More specifically, it may be understood that by maintaining compatibility between wireless power transmitters and receivers having the same 'profile', stable power transfer/reception may be performed, and that power transfer/reception between wireless power transmitters and receivers having different 'profiles' cannot be performed. The 'profiles' may be defined in accordance with whether or not compatibility is possible and/or the application regardless of (or independent from) the power class.

For example, the profile may be sorted into 3 different categories, such as i) Mobile, ii) Power tool and iii) Kitchen.

For another example, the profile may be sorted into 4 different categories, such as i) Mobile, ii) Power tool, iii) Kitchen, and iv) Wearable.

In case of the 'Mobile' profile, the PC may be defined as PC0 and/or PC1, the communication protocol/method may be defined as IB and OB communication, and the operation frequency may be defined as 87 to 205 kHz, and smartphones, laptop computers, and so on, may exist as the exemplary application.

In case of the 'Power tool' profile, the PC may be defined as PC1, the communication protocol/method may be defined as IB communication, and the operation frequency may be defined as 87 to 145 kHz, and power tools, and so on, may exist as the exemplary application.

In case of the 'Kitchen' profile, the PC may be defined as PC2, the communication protocol/method may be defined as NFC-based communication, and the operation frequency may be defined as less than 100 kHz, and kitchen/home appliances, and so on, may exist as the exemplary application.

In the case of power tools and kitchen profiles, NFC communication may be used between the wireless power transmitter and the wireless power receiver. The wireless power transmitter and the wireless power receiver may confirm that they are NFC devices with each other by exchanging WPC NFC data exchange profile format (NDEF).

FIG. 3b shows an example of a WPC NDEF in a wireless power transfer system.

Referring to FIG. 3b, the WPC NDEF may include, for example, an application profile field (e.g., 1B), a version field (e.g., 1B), and profile specific data (e.g., 1B). The application profile field indicates whether the corresponding device is i) mobile and computing, ii) power tool, and iii) kitchen, and an upper nibble in the version field indicates a major version and a lower nibble indicates a minor version. In addition, profile-specific data defines content for the kitchen.

In case of the 'Wearable' profile, the PC may be defined as PC-1, the communication protocol/method may be defined as IB communication, and the operation frequency may be defined as 87 to 205 kHz, and wearable devices that are worn by the users, and so on, may exist as the exemplary application.

It may be mandatory to maintain compatibility between the same profiles, and it may be optional to maintain compatibility between different profiles.

The above-described profiles (Mobile profile, Power tool profile, Kitchen profile, and Wearable profile) may be generalized and expressed as first to nth profile, and a new profile may be added/replaced in accordance with the WPC standard and the exemplary embodiment.

In case the profile is defined as described above, the wireless power transmitter may optionally perform power transfer only to the wireless power receiving corresponding to the same profile as the wireless power transmitter, thereby being capable of performing a more stable power transfer. Additionally, since the load (or burden) of the wireless power transmitter may be reduced and power transfer is not attempted to a wireless power receiver for which compatibility is not possible, the risk of damage in the wireless power receiver may be reduced.

PC1 of the 'Mobile' profile may be defined by being derived from an optional extension, such as OB, based on PC0. And, the 'Power tool' profile may be defined as a simply modified version of the PC1 'Mobile' profile. Additionally, up until now, although the profiles have been defined for the purpose of maintaining compatibility between the same profiles, in the future, the technology may be evolved to a level of maintaining compatibility between different profiles. The wireless power transmitter or the wireless power receiver may notify (or announce) its profile to its counterpart by using diverse methods.

In the AFA standard, the wireless power transmitter is referred to as a power transmitting unit (PTU), and the wireless power receiver is referred to as a power receiving unit (PRU). And, the PTU is categorized to multiple classes, as shown in Table 1, and the PRU is categorized to multiple classes, as shown in Table 2.

TABLE 1

| PTU | $P_{TX\_IN\_MAX}$ | Minimum category support requirement | Minimum value for a maximum number of supported devices |
|---|---|---|---|
| Class 1 | 2 W | 1× Category 1 | 1× Category 1 |
| Class 2 | 10 W | 1× Category 3 | 2× Category 2 |
| Class 3 | 16 W | 1× Category 4 | 2× Category 3 |
| Class 4 | 33 W | 1× Category 5 | 3× Category 3 |
| Class 5 | 50 W | 1× Category 6 | 4× Category 3 |
| Class 6 | 70 W | 1× Category 7 | 5× Category 3 |

TABLE 2

| PRU | $P_{RX\_OUT\_MAX}$ | Exemplary application |
|---|---|---|
| Category 1 | TBD | BLUETOOTH ® headset |
| Category 2 | 3.5 W | Feature phone |
| Category 3 | 6.5 W | Smartphone |
| Category 4 | 13 W | Tablet PC, Phablet |
| Category 5 | 25 W | Small form factor laptop |
| Category 6 | 37.5 W | General laptop |
| Category 7 | 50 W | Home appliance |

As shown in Table 1, a maximum output power capability of Class n PTU may be equal to or greater than the $P_{TX\_IN\_MAX}$ of the corresponding class. The PRU cannot draw a power that is higher than the power level specified in the corresponding category.

Figure 4A:
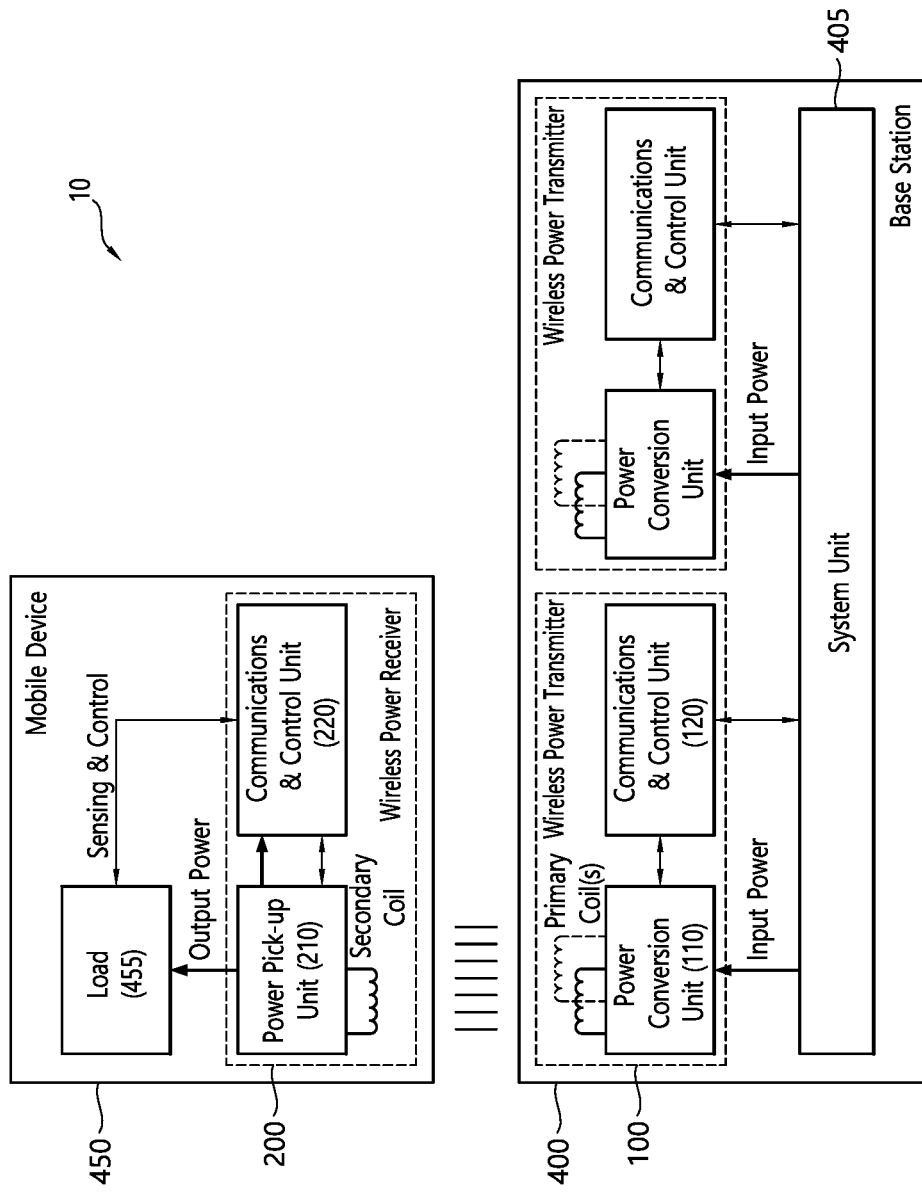
FIG. 4a is a block diagram of a wireless power transfer system according to another exemplary embodiment of the present disclosure.

FIG. 4a is a block diagram of a wireless power transfer system according to another exemplary embodiment of the present disclosure.

Referring to FIG. 4a, the wireless power transfer system (10) includes a mobile device (450), which wirelessly receives power, and a base station (400), which wirelessly transmits power. As a device providing induction power or resonance power, the base station (400) may include at least one of a wireless power transmitter (100) and a system unit (405). The wireless power transmitter (100) may transmit induction power or resonance power and may control the transmission. The wireless power transmitter (100) may include a power conversion unit (110) converting electric energy to a power signal by generating a magnetic field through a primary coil (or primary coils), and a communications & control unit (120) controlling the communication and power transfer between the wireless power receiver (200) in order to transfer power at an appropriate (or suitable) level. The system unit (405) may perform input power provisioning, controlling of multiple wireless power transmitters, and other operation controls of the base station (400), such as user interface control.

The primary coil may generate an electromagnetic field by using an alternating current power (or voltage or current). The primary coil is supplied with an alternating current power (or voltage or current) of a specific frequency, which is being outputted from the power conversion unit (110). And, accordingly, the primary coil may generate a magnetic field of the specific frequency. The magnetic field may be generated in a non-radial shape or a radial shape. And, the wireless power receiver (200) receives the generated magnetic field and then generates an electric current. In other words, the primary coil wirelessly transmits power.

In the magnetic induction method, a primary coil and a secondary coil may have randomly appropriate shapes. For example, the primary coil and the secondary coil may correspond to copper wire being wound around a high-permeability formation, such as ferrite or a non-crystalline metal. The primary coil may also be referred to as a transmitting coil, a primary core, a primary winding, a primary loop antenna, and so on. Meanwhile, the secondary coil may also be referred to as a receiving coil, a secondary core, a secondary winding, a secondary loop antenna, a pickup antenna, and so on.

In case of using the magnetic resonance method, the primary coil and the secondary coil may each be provided in the form of a primary resonance antenna and a secondary resonance antenna. The resonance antenna may have a resonance structure including a coil and a capacitor. At this point, the resonance frequency of the resonance antenna may be determined by the inductance of the coil and a capacitance of the capacitor. Herein, the coil may be formed to have a loop shape. And, a core may be placed inside the loop. The core may include a physical core, such as a ferrite core, or an air core.

The energy transmission (or transfer) between the primary resonance antenna and the second resonance antenna may be performed by a resonance phenomenon occurring in the magnetic field. When a near field corresponding to a resonance frequency occurs in a resonance antenna, and in case another resonance antenna exists near the corresponding resonance antenna, the resonance phenomenon refers to a highly efficient energy transfer occurring between the two resonance antennas that are coupled with one another. When a magnetic field corresponding to the resonance frequency is generated between the primary resonance antenna and the secondary resonance antenna, the primary resonance antenna and the secondary resonance antenna resonate with one another. And, accordingly, in a general case, the magnetic field is focused toward the second resonance antenna at a higher efficiency as compared to a case where the magnetic field that is generated from the primary antenna is radiated to a free space. And, therefore, energy may be transferred to the second resonance antenna from the first resonance antenna at a high efficiency. The magnetic induction method may be implemented similarly to the magnetic resonance method. However, in this case, the frequency of the magnetic field is not required to be a resonance frequency. Nevertheless, in the magnetic induction method, the loops configuring the primary coil and the secondary coil are required to match one another, and the distance between the loops should be very close-ranged.

Although it is not shown in the drawing, the wireless power transmitter (100) may further include a communication antenna. The communication antenna may transmit and/or receive a communication signal by using a communication carrier apart from the magnetic field communication. For example, the communication antenna may transmit and/or receive communication signals corresponding to Wi-Fi, BLUETOOTH®, BLUETOOTH® LE, ZigBee, NFC, and so on.

The communications & control unit (120) may transmit and/or receive information to and from the wireless power receiver (200). The communications & control unit (120) may include at least one of an IB communication module and an OB communication module.

The IB communication module may transmit and/or receive information by using a magnetic wave, which uses a specific frequency as its center frequency. For example, the communications & control unit (120) may perform in-band (IB) communication by transmitting communication information on the operating frequency of wireless power transfer through the primary coil or by receiving communication information on the operating frequency through the primary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (120) may transmit and/or receive information to distances of up to several meters at a data transmission rate of several kbps.

The OB communication module may also perform out-of-band communication through a communication antenna. For example, the communications & control unit (120) may be provided to a near field communication module. Examples of the near field communication module may include communication modules, such as Wi-Fi, BLUETOOTH®, BLUETOOTH® LE, ZigBee, NFC, and so on.

The communications & control unit (120) may control the overall operations of the wireless power transmitter (100). The communications & control unit (120) may perform calculation and processing of diverse information and may also control each configuration element of the wireless power transmitter (100).

The communications & control unit (120) may be implemented in a computer or a similar device as hardware, software, or a combination of the same. When implemented in the form of hardware, the communications & control unit (120) may be provided as an electronic circuit performing control functions by processing electrical signals. And, when implemented in the form of software, the communications & control unit (120) may be provided as a program that operates the communications & control unit (120).

By controlling the operating point, the communications & control unit (120) may control the transmitted power. The operating point that is being controlled may correspond to a combination of a frequency (or phase), a duty cycle, a duty ratio, and a voltage amplitude. The communications & control unit (120) may control the transmitted power by adjusting any one of the frequency (or phase), the duty cycle, the duty ratio, and the voltage amplitude. Additionally, the wireless power transmitter (100) may supply a consistent level of power, and the wireless power receiver (200) may control the level of received power by controlling the resonance frequency.

The mobile device (450) includes a wireless power receiver (200) receiving wireless power through a secondary coil, and a load (455) receiving and storing the power that is received by the wireless power receiver (200) and supplying the received power to the device.

The wireless power receiver (200) may include a power pick-up unit (210) and a communications & control unit (220). The power pick-up unit (210) may receive wireless power through the secondary coil and may convert the received wireless power to electric energy. The power pick-up unit (210) rectifies the alternating current (AC) signal, which is received through the secondary coil, and converts the rectified signal to a direct current (DC) signal. The communications & control unit (220) may control the transmission and reception of the wireless power (transfer and reception of power).

The secondary coil may receive wireless power that is being transmitted from the wireless power transmitter (100). The secondary coil may receive power by using the magnetic field that is generated in the primary coil. Herein, in case the specific frequency corresponds a resonance frequency, magnetic resonance may occur between the primary coil and the secondary coil, thereby allowing power to be transferred with greater efficiency.

Although it is not shown in FIG. 4a, the communications & control unit (220) may further include a communication antenna. The communication antenna may transmit and/or receive a communication signal by using a communication carrier apart from the magnetic field communication. For example, the communication antenna may transmit and/or receive communication signals corresponding to Wi-Fi, BLUETOOTH®, BLUETOOTH® LE, ZigBee, NFC, and so on.

The communications & control unit (220) may transmit and/or receive information to and from the wireless power transmitter (100). The communications & control unit (220) may include at least one of an IB communication module and an OB communication module.

The IB communication module may transmit and/or receive information by using a magnetic wave, which uses a specific frequency as its center frequency. For example, the communications & control unit (220) may perform IB communication by loading information in the magnetic wave and by transmitting the information through the secondary coil or by receiving a magnetic wave carrying information through the secondary coil. At this point, the communications & control unit (120) may load information in the magnetic wave or may interpret the information that is carried by the magnetic wave by using a modulation scheme, such as binary phase shift keying (BPSK), Frequency Shift Keying (FSK) or amplitude shift keying (ASK), and so on, or a coding scheme, such as Manchester coding or non-return-to-zero level (NZR-L) coding, and so on. By using the above-described IB communication, the communications & control unit (220) may transmit and/or receive information to distances of up to several meters at a data transmission rate of several kbps.

The OB communication module may also perform out-of-band communication through a communication antenna. For example, the communications & control unit (220) may be provided to a near field communication module.

Examples of the near field communication module may include communication modules, such as Wi-Fi, BLUETOOTH®, BLUETOOTH® LE, ZigBee, NFC, and so on.

The communications & control unit (220) may control the overall operations of the wireless power receiver (200). The communications & control unit (220) may perform calculation and processing of diverse information and may also control each configuration element of the wireless power receiver (200).

The communications & control unit (220) may be implemented in a computer or a similar device as hardware, software, or a combination of the same. When implemented in the form of hardware, the communications & control unit (220) may be provided as an electronic circuit performing control functions by processing electrical signals. And, when implemented in the form of software, the communications & control unit (220) may be provided as a program that operates the communications & control unit (220).

Figure 4B:
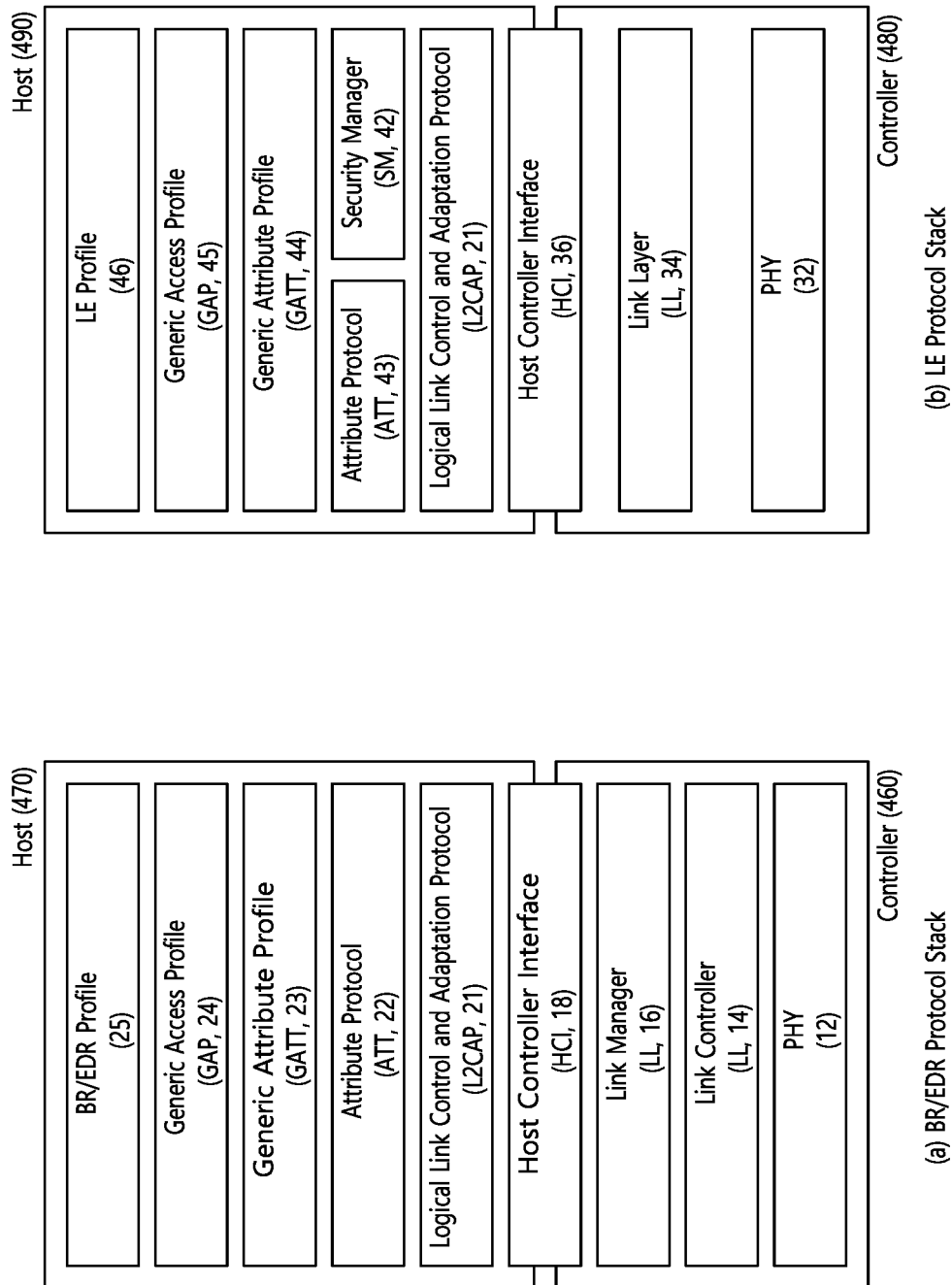
FIG. 4b is a diagram illustrating an example of a BLUETOOTH® communication architecture to which an embodiment according to the present disclosure may be applied.

When the communication/control circuit 120 and the communication/control circuit 220 are BLUETOOTH® or BLUETOOTH® LE as an OB communication module or a short-range communication module, the communication/control circuit 120 and the communication/control circuit 220 may each be implemented and operated with a communication architecture as shown in FIG. 4b.

FIG. 4b is a diagram illustrating an example of a BLUETOOTH® communication architecture to which an embodiment according to the present disclosure may be applied.

Referring to FIG. 4b, (a) of FIG. 4b shows an example of a protocol stack of BLUETOOTH® basic rate (BR)/enhanced data rate (EDR) supporting GATT, and (b) shows an example of BLUETOOTH® low energy (BLE) protocol stack.

Specifically, as shown in (a) of FIG. 4b, the BLUETOOTH® BR/EDR protocol stack may include an upper control stack 460 and a lower host stack 470 based on a host controller interface (HCI) 18.

The host stack (or host module) 470 refers to hardware for transmitting or receiving a BLUETOOTH® packet to or from a wireless transmission/reception module which receives a BLUETOOTH® signal of 2.4 GHZ, and the controller stack 460 is connected to the BLUETOOTH® module to control the BLUETOOTH® module and perform an operation.

The host stack 470 may include a BR/EDR PHY layer 12, a BR/EDR baseband layer 14, and a link manager layer 16.

The BR/EDR PHY layer 12 is a layer that transmits and receives a 2.4 GHz radio signal, and in the case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence for hopping 1400 times per second, and transmits a time slot with a length of 625 us for each channel.

The link manager layer 16 controls an overall operation (link setup, control, security) of BLUETOOTH® connection by utilizing a link manager protocol (LMP).

The link manager layer 16 may perform the following functions.

Performs ACL/SCO logical transport, logical link setup, and control.
  Detach: It interrupts connection and informs a counterpart device about a reason for the interruption.
  Performs power control and role switch.
  Performs security (authentication, pairing, encryption) function.

The host controller interface layer 18 provides an interface between a host module and a controller module so that a host provides commands and data to the controller and the controller provides events and data to the host.

The host stack (or host module, 470) includes a logical link control and adaptation protocol (L2CAP) 21, an attribute protocol 22, a generic attribute profile (GATT) 23, a generic access profile (GAP) 24, and a BR/EDR profile 25.

The logical link control and adaptation protocol (L2CAP) 21 may provide one bidirectional channel for transmitting data to a specific protocol or profile.

The L2CAP 21 may multiplex various protocols, profiles, etc., provided from upper BLUETOOTH®.

L2CAP of BLUETOOTH® BR/EDR uses dynamic channels, supports protocol service multiplexer, retransmission, streaming mode, and provides segmentation and reassembly, per-channel flow control, and error control.

The generic attribute profile (GATT) 23 may be operable as a protocol that describes how the attribute protocol 22 is used when services are configured. For example, the generic attribute profile 23 may be operable to specify how ATT attributes are grouped together into services and may be operable to describe features associated with services.

Accordingly, the generic attribute profile 23 and the attribute protocols (ATT) 22 may use features to describe device's state and services, how features are related to each other, and how they are used.

The attribute protocol 22 and the BR/EDR profile 25 define a service (profile) using BLUETOOTH® BR/EDR and an application protocol for exchanging these data, and the generic access profile (GAP) 24 defines device discovery, connectivity, and security level.

As shown in (b) of FIG. 4b, the BLUETOOTH® LE protocol stack includes a controller stack 480 operable to process a wireless device interface important in timing and a host stack 490 operable to process high level data.

First, the controller stack 480 may be implemented using a communication module that may include a BLUETOOTH® wireless device, for example, a processor module that may include a processing device such as a microprocessor.

The host stack 490 may be implemented as a part of an OS running on a processor module or as an instantiation of a package on the OS.

In some cases, the controller stack and the host stack may be run or executed on the same processing device in a processor module.

The controller stack 480 includes a physical layer (PHY) 32, a link layer 34, and a host controller interface 36.

The physical layer (PHY, wireless transmission/reception module) 32 is a layer that transmits and receives a 2.4 GHz radio signal and uses Gaussian frequency shift keying (GFSK) modulation and a frequency hopping scheme including 40 RF channels.

The link layer 34, which serves to transmit or receive BLUETOOTH® packets, creates connections between devices after performing advertising and scanning functions using 3 advertising channels and provides a function of exchanging data packets of up to 257 bytes through 37 data channels.

The host stack includes a generic access profile (GAP) 45, a logical link control and adaptation protocol (L2CAP, 41), a security manager (SM) 42, and an attribute protocol (ATT) 43, a generic attribute profile (GATT) 44, a generic access profile 45, and an LE profile 46. However, the host stack 490 is not limited thereto and may include various protocols and profiles.

The host stack multiplexes various protocols, profiles, etc., provided from upper BLUETOOTH® using L2CAP.

First, the logical link control and adaptation protocol (L2CAP) 41 may provide one bidirectional channel for transmitting data to a specific protocol or profile.

The L2CAP 41 may be operable to multiplex data between higher layer protocols, segment and reassemble packages, and manage multicast data transmission.

In BLUETOOTH® LE, three fixed channels (one for signaling CH, one for security manager, and one for attribute protocol) are basically used. Also, a dynamic channel may be used as needed.

Meanwhile, a basic channel/enhanced data rate (BR/EDR) uses a dynamic channel and supports protocol service multiplexer, retransmission, streaming mode, and the like.

The security manager (SM) 42 is a protocol for authenticating devices and providing key distribution.

The attribute protocol (ATT) 43 defines a rule for accessing data of a counterpart device in a server-client structure. The ATT has the following 6 message types (request, response, command, notification, indication, confirmation).

①Request and Response message: A request message is a message for requesting specific information from the client device to the server device, and the response message is a response message to the request message, which is a message transmitted from the server device to the client device.

②Command message: It is a message transmitted from the client device to the server device in order to indicate a command of a specific operation. The server device does not transmit a response with respect to the command message to the client device.

③Notification message: It is a message transmitted from the server device to the client device in order to notify an event, or the like. The client device does not transmit a confirmation message with respect to the notification message to the server device.

④Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the BLUETOOTH® LE technology, is used to select a role for communication between BLUETOOTH® LED devices and to control how a multi-profile operation takes place.

Also, the generic access profile (GAP) 45 is mainly used for device discovery, connection generation, and security procedure part, defines a scheme for providing information to a user, and defines types of attributes as follows.

①Service: It defines a basic operation of a device by a combination of behaviors related to data
②Include: It defines a relationship between services
③Characteristics: It is a data value used in a server
④Behavior: It is a format that may be read by a computer defined by a UUID (value type).

The LE profile 46, including profiles dependent upon the GATT, is mainly applied to a BLUETOOTH® LE device. The LE profile 46 may include, for example, Battery, Time, FindMe, Proximity, Time, Object Delivery Service, and the like, and details of the GATT-based profiles are as follows.

①Battery: Battery information exchanging method
②Time: Time information exchanging method
③FindMe: Provision of alarm service according to distance
④Proximity: Battery information exchanging method
⑤Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the BLUETOOTH® low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a BLUETOOTH® connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a BLUETOOTH® connection with the advertising device.

When the scanning device transmits a connection request to the advertising device, the scanning device stops the initiator mode scanning for additional broadcast and enters the connected mode.

Discovering Procedure

Devices available for BLUETOOTH® communication (hereinafter, referred to as "BLUETOOTH® devices") perform an advertising procedure and a scanning procedure in order to discover devices located nearby or in order to be discovered by other devices within a given area.

The discovering procedure is performed asymmetrically. A BLUETOOTH® device intending to discover other device nearby is termed a discovering device, and listens to discover devices advertising an advertising event that may be scanned. A BLUETOOTH® device which may be discovered by other device and available to be used is termed a discoverable device and positively broadcasts an advertising event such that it may be scanned by other device through an advertising (broadcast) physical channel.

Both the discovering device and the discoverable device may have already been connected with other BLUETOOTH® devices in a piconet.

Connecting Procedure

A connecting procedure is asymmetrical, and requests that, while a specific BLUETOOTH® device is performing an advertising procedure, another BLUETOOTH® device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an BLUETOOTH® interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 3 below.

TABLE 3

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

Referring to FIG. 4a, the load (455) may correspond to a battery. The battery may store energy by using the power that is being outputted from the power pick-up unit (210). Meanwhile, the battery is not mandatorily required to be included in the mobile device (450). For example, the battery may be provided as a detachable external feature. As another example, the wireless power receiver may include an operating means that may execute diverse functions of the electronic device instead of the battery.

As shown in the drawing, although the mobile device (450) is illustrated to be included in the wireless power receiver (200) and the base station (400) is illustrated to be included in the wireless power transmitter (100), in a broader meaning, the wireless power receiver (200) may be identified (or regarded) as the mobile device (450), and the wireless power transmitter (100) may be identified (or regarded) as the base station (400).

Figure 4C:
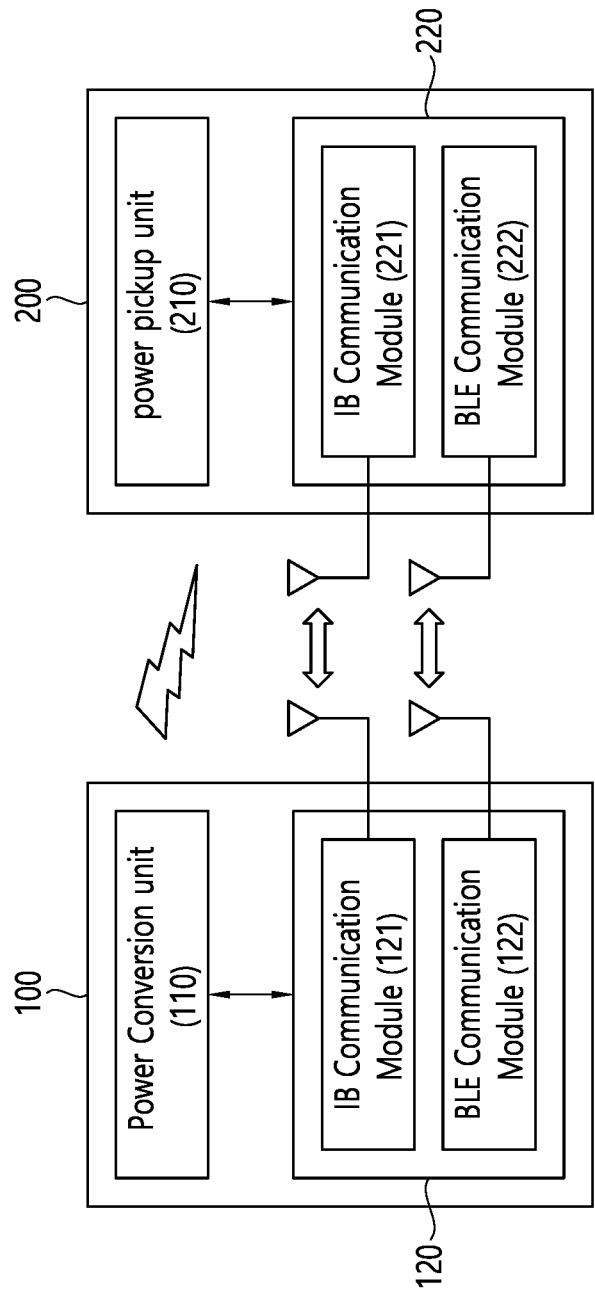
FIG. 4c is a block diagram illustrating a wireless power transfer system using BLE communication according to an example.

When the communication/control circuit 120 and the communication/control circuit 220 include BLUETOOTH® or BLUETOOTH® LE as an OB communication module or a short-range communication module in addition to the IB communication module, the wireless power transmitter 100 including the communication/control circuit 120 and the wireless power receiver 200 including the communication/control circuit 220 may be represented by a simplified block diagram as shown in FIG. 4c.

FIG. 4c is a block diagram illustrating a wireless power transfer system using BLE communication according to an example.

Referring to FIG. 4c, the wireless power transmitter 100 includes a power conversion circuit 110 and a communication/control circuit 120. The communication/control circuit 120 includes an in-band communication module 121 and a BLE communication module 122.

Meanwhile, the wireless power receiver 200 includes a power pickup circuit 210 and a communication/control circuit 220. The communication/control circuit 220 includes an in-band communication module 221 and a BLE communication module 222.

In one aspect, the BLE communication modules 122 and 222 perform the architecture and operation according to FIG. 4b. For example, the BLE communication modules 122 and 222 may be used to establish a connection between the wireless power transmitter 100 and the wireless power receiver 200 and exchange control information and packets necessary for wireless power transfer.

In another aspect, the communication/control circuit 120 may be configured to operate a profile for wireless charging. Here, the profile for wireless charging may be GATT using BLE transmission.

Figure 4D:
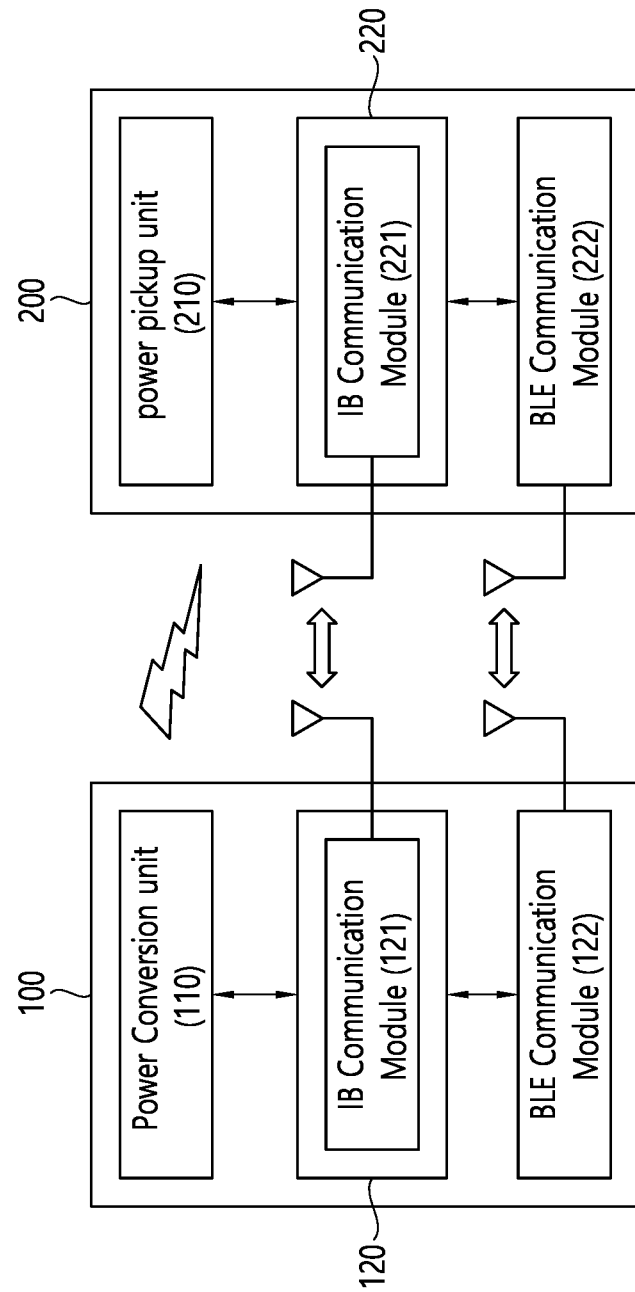
FIG. 4d is a block diagram illustrating a wireless power transfer system using BLE communication according to another example.

FIG. 4d is a block diagram illustrating a wireless power transfer system using BLE communication according to another example.

Referring to FIG. 4d, the communication/control circuits 120 and 220 respectively include only in-band communication modules 121 and 221, and the BLE communication modules 122 and 222 may be provided to be separated from the communication/control circuits 120 and 220.

Hereinafter, the coil or coil unit includes a coil and at least one device being approximate to the coil, and the coil or coil unit may also be referred to as a coil assembly, a coil cell, or a cell.

FIG. 5 is a state transition diagram for describing a wireless power transfer procedure.

Referring to FIG. 5, the power transfer (or transfer) from the wireless power transmitter to the wireless power receiver according to an exemplary embodiment of the present disclosure may be broadly divided into a selection phase (510), a ping phase (520), an identification and configuration phase (530), a negotiation phase (540), a calibration phase (550), a power transfer phase (560), and a renegotiation phase (570).

If a specific error or a specific event is detected when the power transfer is initiated or while maintaining the power transfer, the selection phase (510) may include a shifting phase (or step)—reference numerals S502, S504, S508, S510, and S512. Herein, the specific error or specific event will be specified in the following description. Additionally, during the selection phase (510), the wireless power transmitter may monitor whether or not an object exists on an interface surface. If the wireless power transmitter detects that an object is placed on the interface surface, the process step may be shifted to the ping phase (520). During the selection phase (510), the wireless power transmitter may transmit an analog ping having a power signal (or a pulse) corresponding to an extremely short duration, and may detect whether or not an object exists within an active area of the interface surface based on a current change in the transmitting coil or the primary coil.

In case an object is sensed (or detected) in the selection phase (510), the wireless power transmitter may measure a quality factor of a wireless power resonance circuit (e.g., power transfer coil and/or resonance capacitor). According to the exemplary embodiment of the present disclosure, during the selection phase (510), the wireless power transmitter may measure the quality factor in order to determine whether or not a foreign object exists in the charging area along with the wireless power receiver. In the coil that is provided in the wireless power transmitter, inductance and/or components of the series resistance may be reduced due to a change in the environment, and, due to such decrease, a value of the quality factor may also be decreased. In order to determine the presence or absence of a foreign object by using the measured quality factor value, the wireless power transmitter may receive from the wireless power receiver a reference quality factor value, which is measured in advance in a state where no foreign object is placed within the charging area. The wireless power transmitter may determine the presence or absence of a foreign object by comparing the measured quality factor value with the reference quality factor value, which is received during the negotiation phase (540). However, in case of a wireless power receiver having a low reference quality factor value—e.g., depending upon its type, purpose, characteristics, and so on, the wireless power receiver may have a low reference quality factor value—in case a foreign object exists, since the difference between the reference quality factor value and the measured quality factor value is small (or insignificant), a problem may occur in that the presence of the foreign object cannot be easily determined. Accordingly, in this case, other determination factors should be further considered, or the present or absence of a foreign object should be determined by using another method.

According to another exemplary embodiment of the present disclosure, in case an object is sensed (or detected) in the selection phase (510), in order to determine whether or not a foreign object exists in the charging area along with the wireless power receiver, the wireless power transmitter may measure the quality factor value within a specific frequency area (e.g., operation frequency area). In the coil that is provided in the wireless power transmitter, inductance and/or components of the series resistance may be reduced due to a change in the environment, and, due to such decrease, the resonance frequency of the coil of the wireless power transmitter may be changed (or shifted). More specifically, a quality factor peak frequency that corresponds to a frequency in which a maximum quality factor value is measured within the operation frequency band may be moved (or shifted).

In the ping phase (520), if the wireless power transmitter detects the presence of an object, the transmitter activates (or Wakes up) a receiver and transmits a digital ping for identifying whether or not the detected object corresponds to the wireless power receiver. During the ping phase (520), if the wireless power transmitter fails to receive a response signal for the digital ping—e.g., a signal intensity packet—from the receiver, the process may be shifted back to the selection phase (510). Additionally, in the ping phase (520), if the wireless power transmitter receives a signal indicating the completion of the power transfer—e.g., charging complete packet—from the receiver, the process may be shifted back to the selection phase (510).

If the ping phase (520) is completed, the wireless power transmitter may shift to the identification and configuration phase (530) for identifying the receiver and for collecting configuration and status information.

In the identification and configuration phase (530), if the wireless power transmitter receives an unwanted packet (i.e., unexpected packet), or if the wireless power transmitter fails to receive a packet during a predetermined period of time (i.e., out of time), or if a packet transmission error occurs (i.e., transmission error), or if a power transfer contract is not configured (i.e., no power transfer contract), the wireless power transmitter may shift to the selection phase (510).

The wireless power transmitter may confirm (or verify) whether or not its entry to the negotiation phase (540) is needed based on a Negotiation field value of the configuration packet, which is received during the identification and configuration phase (530). Based on the verified result, in case a negotiation is needed, the wireless power transmitter enters the negotiation phase (540) and may then perform a predetermined FOD detection procedure. Conversely, in case a negotiation is not needed, the wireless power transmitter may immediately enter the power transfer phase (560).

In the negotiation phase (540), the wireless power transmitter may receive a Foreign Object Detection (FOD) status packet that includes a reference quality factor value. Or, the wireless power transmitter may receive an FOD status packet that includes a reference peak frequency value. Alternatively, the wireless power transmitter may receive a status packet that includes a reference quality factor value and a reference peak frequency value. At this point, the wireless power transmitter may determine a quality coefficient threshold value for FO detection based on the reference quality factor value. The wireless power transmitter may determine a peak frequency threshold value for FO detection based on the reference peak frequency value.

The wireless power transmitter may detect the presence or absence of an FO in the charging area by using the determined quality coefficient threshold value for FO detection and the currently measured quality factor value (i.e., the quality factor value that was measured before the ping phase), and, then, the wireless power transmitter may control the transmitted power in accordance with the FO detection result. For example, in case the FO is detected, the power transfer may be stopped. However, the present disclosure will not be limited only to this.

The wireless power transmitter may detect the presence or absence of an FO in the charging area by using the determined peak frequency threshold value for FO detection and the currently measured peak frequency value (i.e., the peak frequency value that was measured before the ping phase), and, then, the wireless power transmitter may control the transmitted power in accordance with the FO detection result. For example, in case the FO is detected, the power transfer may be stopped. However, the present disclosure will not be limited only to this.

In case the FO is detected, the wireless power transmitter may return to the selection phase (510). Conversely, in case the FO is not detected, the wireless power transmitter may proceed to the calibration phase (550) and may, then, enter the power transfer phase (560). More specifically, in case the FO is not detected, the wireless power transmitter may determine the intensity of the received power that is received by the receiving end during the calibration phase (550) and may measure power loss in the receiving end and the transmitting end in order to determine the intensity of the power that is transmitted from the transmitting end. In other words, during the calibration phase (550), the wireless power transmitter may estimate the power loss based on a difference between the transmitted power of the transmitting end and the received power of the receiving end. The wireless power transmitter according to the exemplary embodiment of the present disclosure may calibrate the threshold value for the FOD detection by applying the estimated power loss.

In the power transfer phase (560), in case the wireless power transmitter receives an unwanted packet (i.e., unexpected packet), or in case the wireless power transmitter fails to receive a packet during a predetermined period of time (i.e., time-out), or in case a violation of a predetermined power transfer contract occurs (i.e., power transfer contract violation), or in case charging is completed, the wireless power transmitter may shift to the selection phase (510).

Additionally, in the power transfer phase (560), in case the wireless power transmitter is required to reconfigure the power transfer contract in accordance with a status change in the wireless power transmitter, the wireless power transmitter may shift to the renegotiation phase (570). At this point, if the renegotiation is successfully completed, the wireless power transmitter may return to the power transfer phase (560).

In this embodiment, the calibration step 550 and the power transfer phase 560 are divided into separate steps, but the calibration step 550 may be integrated into the power transfer phase 560. In this case, operations in the calibration step 550 may be performed in the power transfer phase 560.

The above-described power transfer contract may be configured based on the status and characteristic information of the wireless power transmitter and receiver. For example, the wireless power transmitter status information may include information on a maximum amount of transmittable power, information on a maximum number of receivers that may be accommodated, and so on. And, the receiver status information may include information on the required power, and so on.

Figure 6:
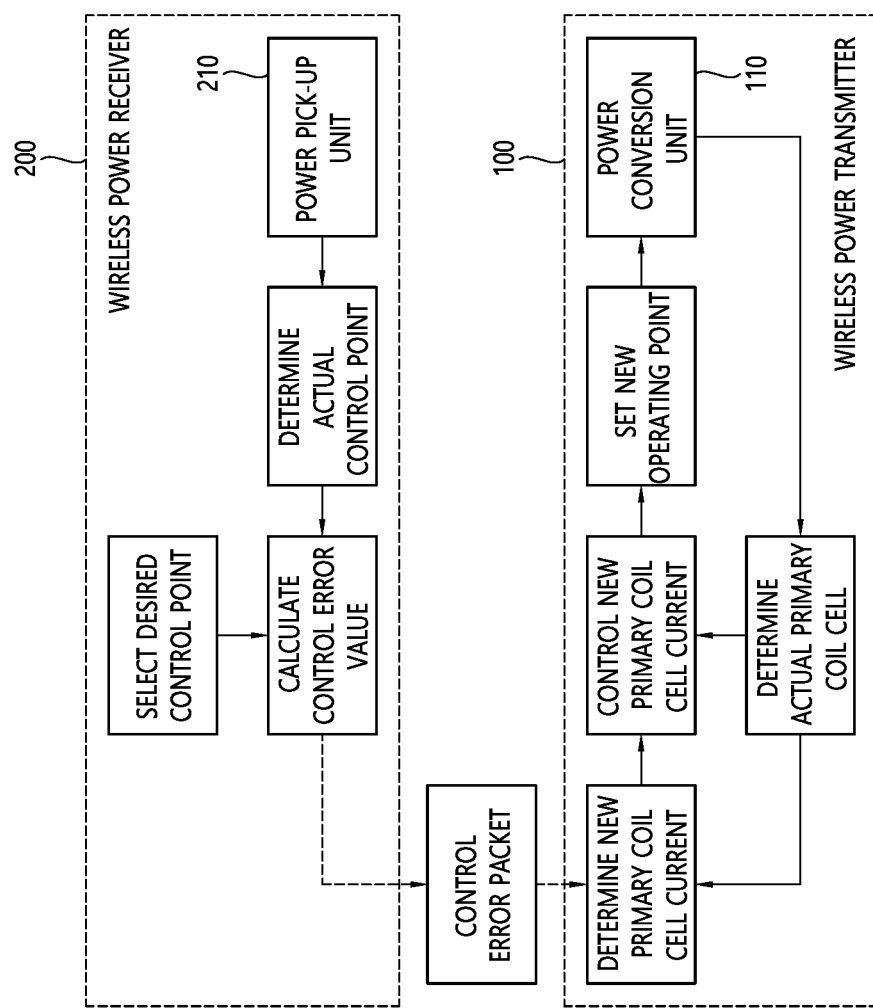
FIG. 6 shows a power control method according to an exemplary embodiment of the present disclosure.

FIG. 6 shows a power control method according to an exemplary embodiment of the present disclosure.

As shown in FIG. 6, in the power transfer phase (560), by alternating the power transfer and/or reception and communication, the wireless power transmitter (100) and the wireless power receiver (200) may control the amount (or size) of the power that is being transferred. The wireless power transmitter and the wireless power receiver operate at a specific control point. The control point indicates a combination of the voltage and the electric current that are provided from the output of the wireless power receiver, when the power transfer is performed.

More specifically, the wireless power receiver selects a desired control point, a desired output current/voltage, a temperature at a specific location of the mobile device, and so on, and additionally determines an actual control point at which the receiver is currently operating. The wireless power receiver calculates a control error value by using the desired control point and the actual control point, and, then, the wireless power receiver may transmit the calculated control error value to the wireless power transmitter as a control error packet.

Also, the wireless power transmitter may configure/control a new operating point—amplitude, frequency, and duty cycle—by using the received control error packet, so as to control the power transfer. Therefore, the control error packet may be transmitted/received at a constant time interval during the power transfer phase, and, according to the exemplary embodiment, in case the wireless power receiver attempts to reduce the electric current of the wireless power transmitter, the wireless power receiver may transmit the control error packet by setting the control error value to a negative number. And, in case the wireless power receiver intends to increase the electric current of the wireless power transmitter, the wireless power receiver transmit the control error packet by setting the control error value to a positive number. During the induction mode, by transmitting the control error packet to the wireless power transmitter as described above, the wireless power receiver may control the power transfer.

In the resonance mode, which will hereinafter be described in detail, the device may be operated by using a method that is different from the induction mode. In the resonance mode, one wireless power transmitter should be capable of serving a plurality of wireless power receivers at the same time. However, in case of controlling the power transfer just as in the induction mode, since the power that is being transferred is controlled by a communication that is established with one wireless power receiver, it may be difficult to control the power transfer of additional wireless power receivers. Therefore, in the resonance mode according to the present disclosure, a method of controlling the amount of power that is being received by having the wireless power transmitter commonly transfer (or transmit) the basic power and by having the wireless power receiver control its own resonance frequency. Nevertheless, even during the operation of the resonance mode, the method described above in FIG. 6 will not be completely excluded. And, additional control of the transmitted power may be performed by using the method of FIG. 6.

Figure 7:
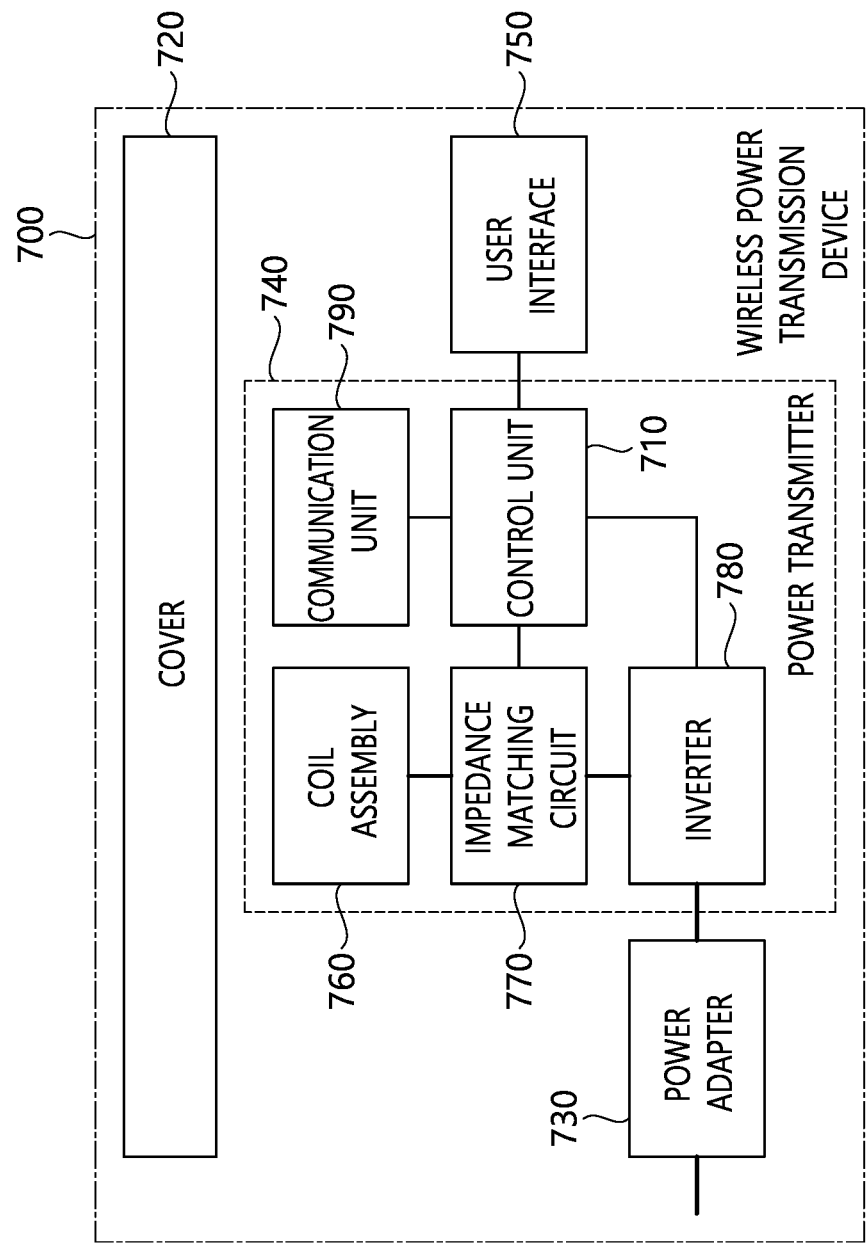
FIG. 7 is a block diagram of a wireless power transmitter according to another exemplary embodiment of the present disclosure.

FIG. 7 is a block diagram of a wireless power transmitter according to another exemplary embodiment of the present disclosure. This may belong to a wireless power transfer system that is being operated in the magnetic resonance mode or the shared mode. The shared mode may refer to a mode performing a several-for-one (or one-to-many) communication and charging between the wireless power transmitter and the wireless power receiver. The shared mode may be implemented as a magnetic induction method or a resonance method.

Referring to FIG. 7, the wireless power transmitter (700) may include at least one of a cover (720) covering a coil assembly, a power adapter (730) supplying power to the power transmitter (740), a power transmitter (740) transmitting wireless power, and a user interface (750) providing information related to power transfer processing and other related information. Most particularly, the user interface (750) may be optionally included or may be included as another user interface (750) of the wireless power transmitter (700).

The power transmitter (740) may include at least one of a coil assembly (760), an impedance matching circuit (770), an inverter (780), a communication unit (790), and a control unit (710).

The coil assembly (760) includes at least one primary coil generating a magnetic field. And, the coil assembly (760) may also be referred to as a coil cell.

The impedance matching circuit (770) may provide impedance matching between the inverter and the primary coil(s). The impedance matching circuit (770) may generate resonance from a suitable frequency that boosts the electric current of the primary coil(s). In a multi-coil power transmitter (740), the impedance matching circuit may additionally include a multiplex that routes signals from the inverter to a subset of the primary coils. The impedance matching circuit may also be referred to as a tank circuit.

The impedance matching circuit (770) may include a capacitor, an inductor, and a switching device that switches the connection between the capacitor and the inductor. The impedance matching may be performed by detecting a reflective wave of the wireless power that is being transferred (or transmitted) through the coil assembly (760) and by switching the switching device based on the detected reflective wave, thereby adjusting the connection status of the capacitor or the inductor or adjusting the capacitance of the capacitor or adjusting the inductance of the inductor. In some cases, the impedance matching may be carried out even though the impedance matching circuit (770) is omitted. This specification also includes an exemplary embodiment of the wireless power transmitter (700), wherein the impedance matching circuit (770) is omitted.

The inverter (780) may convert a DC input to an AC signal. The inverter (780) may be operated as a half-bridge inverter or a full-bridge inverter in order to generate a pulse wave and a duty cycle of an adjustable frequency. Additionally, the inverter may include a plurality of stages in order to adjust input voltage levels.

The communication unit (790) may perform communication with the power receiver. The power receiver performs load modulation in order to communicate requests and information corresponding to the power transmitter. Therefore, the power transmitter (740) may use the communication unit (790) so as to monitor the amplitude and/or phase of the electric current and/or voltage of the primary coil in order to demodulate the data being transmitted from the power receiver.

Additionally, the power transmitter (740) may control the output power to that the data may be transferred through the communication unit (790) by using a Frequency Shift Keying (FSK) method, and so on.

The control unit (710) may control communication and power transfer (or delivery) of the power transmitter (740). The control unit (710) may control the power transfer by adjusting the above-described operating point. The operating point may be determined by, for example, at least any one of the operation frequency, the duty cycle, and the input voltage.

The communication unit (790) and the control unit (710) may each be provided as a separate unit/device/chipset or may be collectively provided as one unit/device/chipset.

Figure 8:
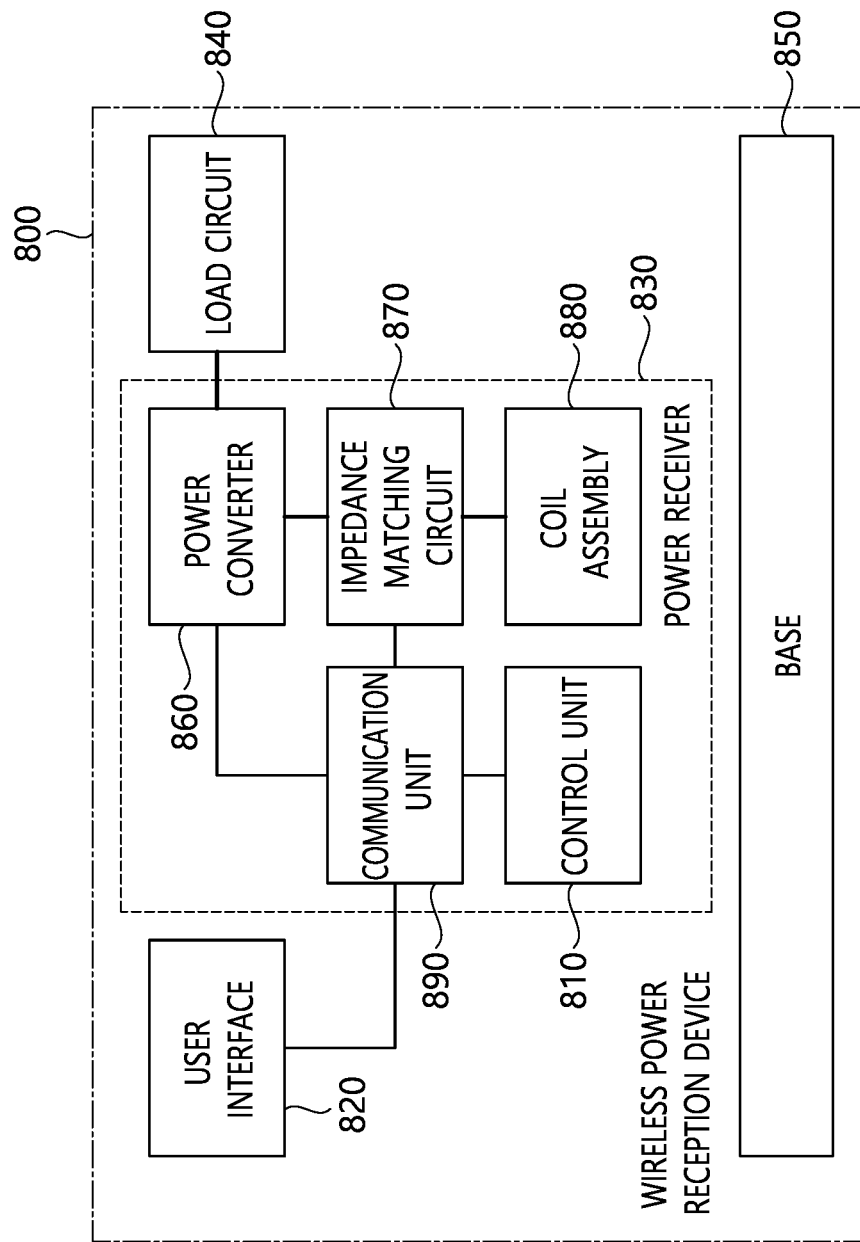
FIG. 8 shows a wireless power receiver according to another exemplary embodiment of the present disclosure.

FIG. 8 shows a wireless power receiver according to another exemplary embodiment of the present disclosure. This may belong to a wireless power transfer system that is being operated in the magnetic resonance mode or the shared mode.

Referring to FIG. 8, the wireless power receiver (800) may include at least one of a user interface (820) providing information related to power transfer processing and other related information, a power receiver (830) receiving wireless power, a load circuit (840), and a base (850) supporting and covering the coil assembly. Most particularly, the user interface (820) may be optionally included or may be included as another user interface (820) of the wireless power receiver (800).

The power receiver (830) may include at least one of a power converter (860), an impedance matching circuit (870), a coil assembly (880), a communication unit (890), and a control unit (810).

The power converter (860) may convert the AC power that is received from the secondary coil to a voltage and electric current that are suitable for the load circuit. According to an exemplary embodiment, the power converter (860) may include a rectifier. The rectifier may rectify the received wireless power and may convert the power from an alternating current (AC) to a direct current (DC). The rectifier may convert the alternating current to the direct current by using a diode or a transistor, and, then, the rectifier may smooth the converted current by using the capacitor and resistance. Herein, a full-wave rectifier, a half-wave rectifier, a voltage multiplier, and so on, that are implemented as a bridge circuit may be used as the rectifier. Additionally, the power converter may adapt a reflected impedance of the power receiver.

The impedance matching circuit (870) may provide impedance matching between a combination of the power converter (860) and the load circuit (840) and the secondary coil. According to an exemplary embodiment, the impedance matching circuit may generate a resonance of approximately 100 kHz, which may reinforce the power transfer. The impedance matching circuit (870) may include a capacitor, an inductor, and a switching device that switches the combination of the capacitor and the inductor. The impedance matching may be performed by controlling the switching device of the circuit that configured the impedance matching circuit (870) based on the voltage value, electric current value, power value, frequency value, and so on, of the wireless power that is being received. In some cases, the impedance matching may be carried out even though the impedance matching circuit (870) is omitted. This specification also includes an exemplary embodiment of the wireless power receiver (200), wherein the impedance matching circuit (870) is omitted.

The coil assembly (880) includes at least one secondary coil, and, optionally, the coil assembly (880) may further include an element shielding the metallic part of the receiver from the magnetic field.

The communication unit (890) may perform load modulation in order to communicate requests and other information to the power transmitter.

For this, the power receiver (830) may perform switching of the resistance or capacitor so as to change the reflected impedance.

The control unit (810) may control the received power. For this, the control unit (810) may determine/calculate a difference between an actual operating point and a target operating point of the power receiver (830). Thereafter, by performing a request for adjusting the reflected impedance of the power transmitter and/or for adjusting an operating point of the power transmitter, the difference between the actual operating point and the target operating point may be adjusted/reduced. In case of minimizing this difference, an optimal power reception may be performed.

The communication unit (890) and the control unit (810) may each be provided as a separate device/chipset or may be collectively provided as one device/chipset.

Figure 9:
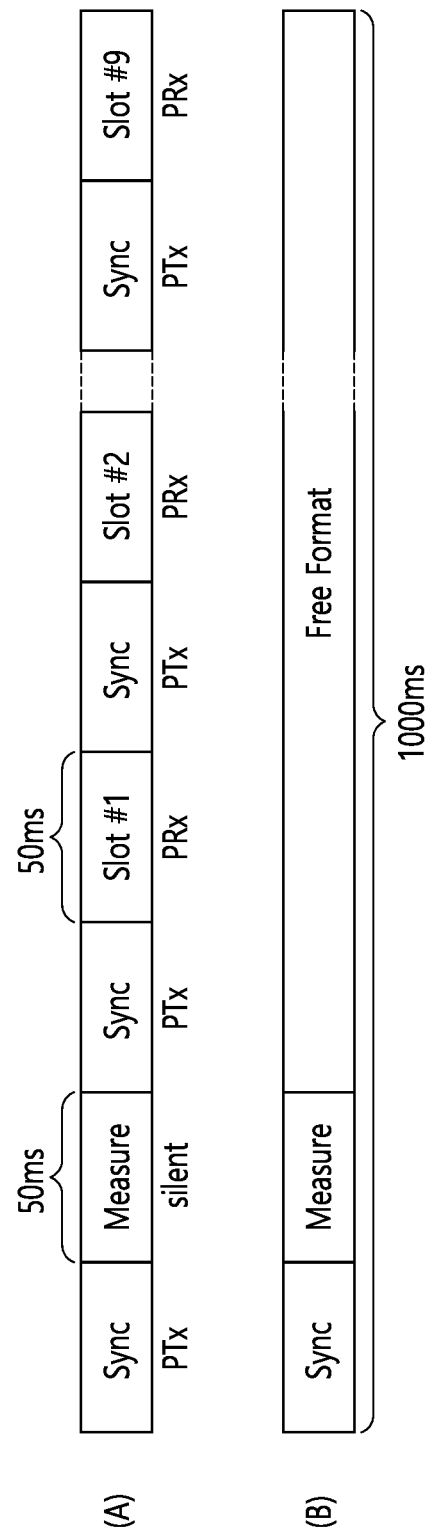
FIG. 9 shows a communication frame structure according to an embodiment. This may be a communication frame structure in a shared mode.

FIG. 9 shows a communication frame structure according to an embodiment. This may be a communication frame structure in a shared mode.

Referring to FIG. 9, in the shared mode, different types of frames may be used together. For example, in the shared mode, a slotted frame having a plurality of slots as shown in (A) and a free format frame having no specific shape as shown in (B) may be used. More specifically, the slot frame is a frame for transmitting short data packets from the wireless power receiver 200 to the wireless power transmitter 100, since the free-form frame does not have a plurality of slots, it may be a frame in which long data packets can be transmitted.

Meanwhile, the slot frame and the free-form frame may be changed to various names by those skilled in the art. For example, a slot frame may be changed to a channel frame, a free-form frame may be changed to a message frame, and the like.

More specifically, the slot frame may include a sync pattern indicating the start of a slot, a measurement slot, 9 slots, and an additional sync pattern having the same time interval prior to each of the 9 slots.

Here, the additional sync pattern is a sync pattern different from the sync pattern indicating the start of the frame described above. More specifically, the additional sync pattern may not indicate the start of a frame, but may indicate information related to adjacent slots (i.e., two consecutive slots located on both sides of the sync pattern).

A sync pattern may be positioned between two consecutive slots among the nine slots. In this case, the sync pattern may provide information related to the two consecutive slots.

Also, the nine slots and the sync patterns provided prior to each of the nine slots may have the same time interval. For example, the nine slots may have a time interval of 50 ms. Also, the nine sync patterns may have a time length of 50 ms.

Meanwhile, a free-form frame as shown in (B) may not have a specific shape other than a sync pattern indicating the start of the frame and a measurement slot. That is, the free-form frame is for performing a different role from the slot frame, for example, performing communication of long data packets (e.g., additional owner information packets) between the wireless power transmitter and the wireless power receiver, or in the wireless power transmitter consisting of a plurality of coils, it may be used for a role of selecting any one of the plurality of coils.

Hereinafter, a sync pattern included in each frame will be described in more detail with drawings.

FIG. 10 is a structure of a sync pattern according to an exemplary embodiment.

Referring to FIG. 10, the sync pattern can be composed of preamble, start bit, response field, type field, info field and parity bit. In FIG. 10, the start bit is shown as ZERO.

More specifically, the preamble consists of consecutive bits, and all of them may be set to 0. That is, the preamble may be bits for matching the time length of the sync pattern.

The number of bits constituting the preamble may depend on the operating frequency so that the length of the sync pattern is closest to 50 ms, but within a range that does not exceed 50 ms. For example, when the operating frequency is 100 kHz, the sync pattern may be composed of two preamble bits, and when the operating frequency is 105 kHz, the sync pattern may be composed of three preamble bits.

The start bit is a bit following the preamble and may mean ZERO. The zero may be a bit indicating the type of the sync pattern. Here, the types of sync patterns may include frame sync including frame-related information and slot sync including slot information. That is, the sync pattern is located between successive frames, it is a frame sync indicating the start of a frame, or located between consecutive slots among a plurality of slots constituting a frame, it may be a slot sink including information related to the successive slots.

For example, when the zero is 0, it means that the corresponding slot is slot sync located between the slots, and when it is 1, it can mean that the corresponding sync pattern is frame sync located between the frames.

The parity bit is the last bit of the sync pattern and may indicate information on the number of bits constituting the data fields (i.e., the response field, the type field, and the information field) of the sync pattern. For example, the previous parity bit may be 1 when the number of bits constituting the data fields of the sync pattern is an even number, and 0 in other cases (i.e., an odd number).

The response field may include response information of the wireless power transmitter for communication with the wireless power receiver in a slot before the sync pattern. For example, the response field may have '00' when communication with the wireless power receiver is not detected. Also, the response field may have '01' when a communication error is detected in communication with the wireless power receiver. The communication error may be a case in which two or more wireless power receivers attempt to access one slot, and a collision occurs between two or more wireless power receivers.

Also, the response field may include information indicating whether a data packet has been correctly received from the wireless power receiver. More specifically, when the wireless power transmitter denies the data packet, the response field may be "10" (10-not acknowledge, NAK), when the wireless power transmitter confirms the data packet, it may be "11" (11-acknowledge, ACK).

The type field may indicate the type of the sync pattern. More specifically, the type field may have '1' indicating frame sync when the sync pattern is the first sync pattern of the frame (i.e., the first sync pattern of the frame, which is located before the measurement slot).

Also, in the slot frame, when the sync pattern is not the first sync pattern of the frame, the type field may have '0' indicating slot sync.

Also, the meaning of the value of the information field may be determined according to the type of the sync pattern indicated by the type field. For example, when the type field is 1 (i.e., indicating frame sync), the meaning of the information field may indicate the type of frame. That is, the information field may indicate whether the current frame is a slotted frame or a free-format frame. For example, when the information field is '00', it may indicate a slot frame, and when the information field is '01', it may indicate a free-form frame.

On the other hand, when the type field is 0 (i.e., slot sync), the information field may indicate the state of the next slot located after the sync pattern. More specifically, when the next slot is a slot allocated to a specific wireless power receiver, the information field has '00', in the case of a locked slot for a specific wireless power receiver to use temporarily, it has '01', alternatively, when any wireless power receiver is a freely usable slot, it may have '10'.

Figure 11:
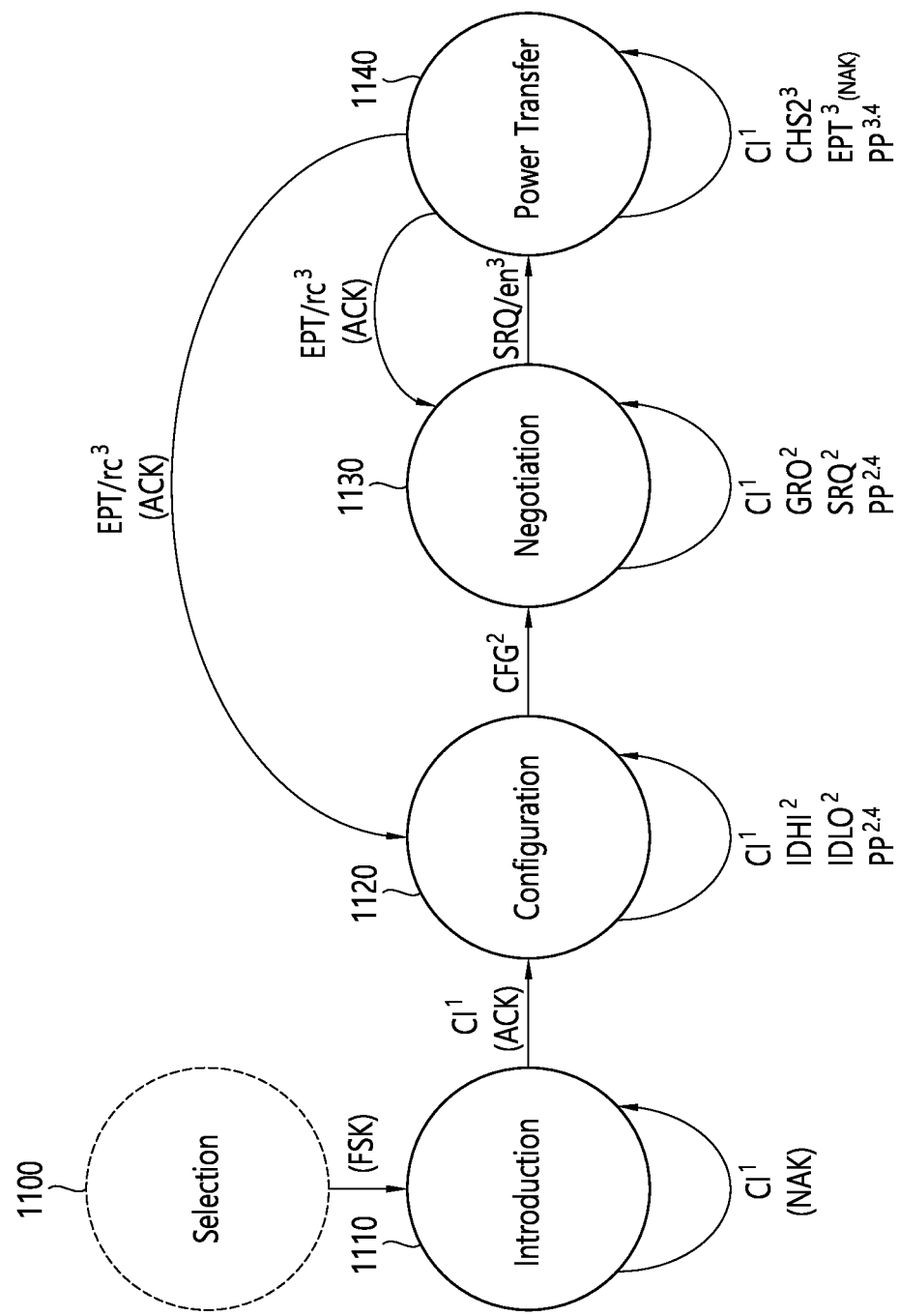
FIG. 11 illustrates operation states of a wireless power transmitter and a wireless power receiver in a shared mode according to an embodiment.

FIG. 11 illustrates operation states of a wireless power transmitter and a wireless power receiver in a shared mode according to an embodiment.

Referring to FIG. 11, a wireless power receiver operating in shared mode, it can operate in any one of the states of Selection Phase (1100), Introduction Phase 1110, Configuration Phase (1120), Negotiation Phase 1130 and Power Transfer Phase (1140).

First, the wireless power transmitter according to an embodiment may transmit a wireless power signal to detect the wireless power receiver. That is, the process of detecting the wireless power receiver using the wireless power signal may be referred to as analog ping.

Meanwhile, the wireless power receiver receiving the wireless power signal may enter the selection phase 1100. As described above, the wireless power receiver entering the selection phase 1100 may detect the presence of an FSK signal on the wireless power signal.

That is, the wireless power receiver may perform communication in either the exclusive mode or the shared mode according to the presence of the FSK signal.

More specifically, the wireless power receiver operates in a shared mode when the FSK signal is included in the wireless power signal, otherwise, it can operate in exclusive mode.

When the wireless power receiver operates in the shared mode, the wireless power receiver may enter an introduction phase 1110. In order to transmit a control information packet (CI, Control Information packet) in the configuration phase, negotiation phase and power transfer phase, in the introduction phase 1110, the wireless power receiver may transmit a control information packet to the wireless power transmitter. The control information packet may have a header and control-related information. For example, the control information packet may have a header of 0X53.

In the introduction phase 1110, the wireless power receiver attempts to request a free slot to transmit a control information (CI) packet over the following configuration, negotiation, and power transfer phases. At this time, the wireless power receiver selects a free slot and transmits the first CI packet. If the wireless power transmitter responds with ACK to the CI packet, the wireless power transmitter enters the configuration phase. If the wireless power transmitter responds with NAK, another wireless power receiver is in the process of configuring and negotiating. In this case, the wireless power receiver retries the request for a free slot.

If the wireless power receiver receives an ACK in response to the CI packet, the wireless power receiver determines the position of a private slot in the frame by counting the remaining slot sinks up to the first frame sink. In all subsequent slot-based frames, the wireless power receiver transmits the CI packet through the corresponding slot.

If the wireless power transmitter allows the wireless power receiver to proceed to the configuration phase, the wireless power transmitter provides a series of locked slots for exclusive use of the wireless power receiver. This ensures that the wireless power receiver proceeds through the configuration phase without conflicts.

The wireless power receiver transmits sequences of data packets such as two identification data packets (IDHI and IDLO) using a lock slot. After completing this step, the wireless power receiver enters the negotiation phase. In the negotiation phase, the wireless power transmitter continues to provide a lock slot for exclusive use to the wireless power receiver. This ensures that the wireless power receiver proceeds with the negotiation phase without collision.

The wireless power receiver transmits one or more negotiation data packets using the corresponding lock slot, it may be mixed with private data packets. Eventually, the sequence ends with a specific request (SRQ) packet. When the sequence is complete, the wireless power receiver enters the power transmission phase, and the wireless power transmitter stops providing the lock slot.

In the power transfer phase, the wireless power receiver transmits the CI packet using the allocated slot and receives power. The wireless power receiver may include a regulator circuit. The regulator circuit may be included in the communication/control circuit. The wireless power receiver may self-regulate the reflection impedance of the wireless power receiver through a regulator circuit. In other words, the wireless power receiver may adjust the reflected impedance in order to transmit the amount of power required by the external load. This can prevent excessive power reception and overheating.

In the shared mode, since the wireless power transmitter may not perform power adjustment in response to the received CI packet (according to the operation mode), in this case, control to prevent an overvoltage state may be required.

Hereinafter, authentication between a wireless power transmitter and a wireless power receiver is disclosed.

A wireless power transfer system using in-band communication can use USB-C certification. Authentication includes authentication of the wireless power transmitter by the wireless power receiver and authentication of the wireless power receiver by the wireless power transmitter.

FIG. 12 is a block diagram illustrating a wireless charging certificate format according to an embodiment.

Referring to FIG. 12, the wireless charging certificate format includes Certificate Structure Version, reserved bit, certificate type, signature offset, serial number, issuer ID, subject ID, public key, and signature.

The certificate type is 3 bits, for example, and may indicate that the corresponding certificate is any one of a root certificate/intermediate certificate/final certificate, it may represent a certificate for a wireless power transmitter or a certificate for a wireless power receiver, or both.

For example, the certificate type is 3 bits and may indicate information about a root certificate, a manufacturer/secondary certificate, a product unit certificate (for the power transmitter), and the like. More specifically, when the certificate type is '001'b, it represents a root certificate, and when it is '010'b, it represents an intermediate certificate (Manufacturer/Secondary Certificate), in the case of '111'b, it may indicate a product unit certificate for the power transmitter, which is a final certificate.

The wireless power transmitter may inform the wireless power receiver whether the authentication function is supported by using a capability packet (In case of authentication of PTx by PRx). Meanwhile, the wireless power receiver may inform the wireless power transmitter whether the authentication function is supported by using a configuration packet (In the case of authentication of PRx by PTx of a wireless power receiver by a wireless power transmitter). Hereinafter, the structure of indication information (capability packet and configuration packet) on whether authentication function is supported will be described in more detail.

FIG. 13 is a capability packet structure of a wireless power transmitter according to an embodiment.

Referring to FIG. 13, a capability packet having a corresponding header value of 0X31 is 3 bytes, the first byte (B0) contains the power class, guaranteed power value, the second byte (B1) contains the reserved, potential power value, the third byte (B2) includes Authentication Initiator (AI), Authentication Responder (AR), Reserved, WPID, and Not Res Sens. Specifically, the authentication initiator is 1 bit, and for example, if the value is '1b', it indicates that the corresponding wireless power transmitter can operate as an authentication initiator. In addition, the authentication responder is 1 bit, and for example, if its value is '1b', it indicates that the corresponding wireless power transmitter can operate as an authentication responder.

FIG. 14 is a configuration packet structure of a wireless power receiver according to an embodiment.

Referring to FIG. 14, a configuration packet having a corresponding header value of 0X51 is 5 bytes, the first byte (B0) contains the power class, maximum power value, the second byte (B1) contains AI, AR, reserve, the third byte (B2) contains Prop, Reserve, ZERO, Count, the fourth byte (B3) contains the window size and window offset, the fifth byte (B4) includes Neg, polarity, depth, authentication, and reserve. Specifically, the authentication initiator is 1 bit, and for example, if the value is '1b', it indicates that the corresponding wireless power receiver can operate as an authentication initiator. In addition, the authentication responder is 1 bit, and for example, if its value is '1b', it indicates that the corresponding wireless power receiver can operate as an authentication responder.

A message used in an authentication procedure is called an authentication message. Authentication messages are used to convey information related to authentication. There are two types of authentication messages. One is an authentication request and the other is an authentication response. An authentication request is sent by an authentication initiator, and an authentication response is sent by an authentication responder. The wireless power transmitter and receiver may be an authentication initiator or an authentication responder. For example, when the wireless power transmitter is an authentication initiator, the wireless power receiver becomes an authentication responder, when the wireless power receiver is the authentication initiator, the wireless power transmitter becomes the authentication responder.

The authentication request message includes GET_DIGESTS (i.e. 4 bytes), GET_CERTIFICATE (i.e. 8 bytes), and CHALLENGE (i.e. 36 bytes).

The authentication response message includes DIGESTS (i.e. 4+32 bytes), CERTIFICATE (i.e. 4+certificate chain (3×512 bytes)=1540 bytes), CHALLENGE_AUTH (i.e. 168 bytes), and ERROR (i.e. 4 bytes).

The authentication message may be called an authentication packet, or may be called authentication data or authentication control information. Also, messages such as GET_DIGEST and DIGESTS may be called GET_DIGEST packets and DIGEST packets.

Figure 15:
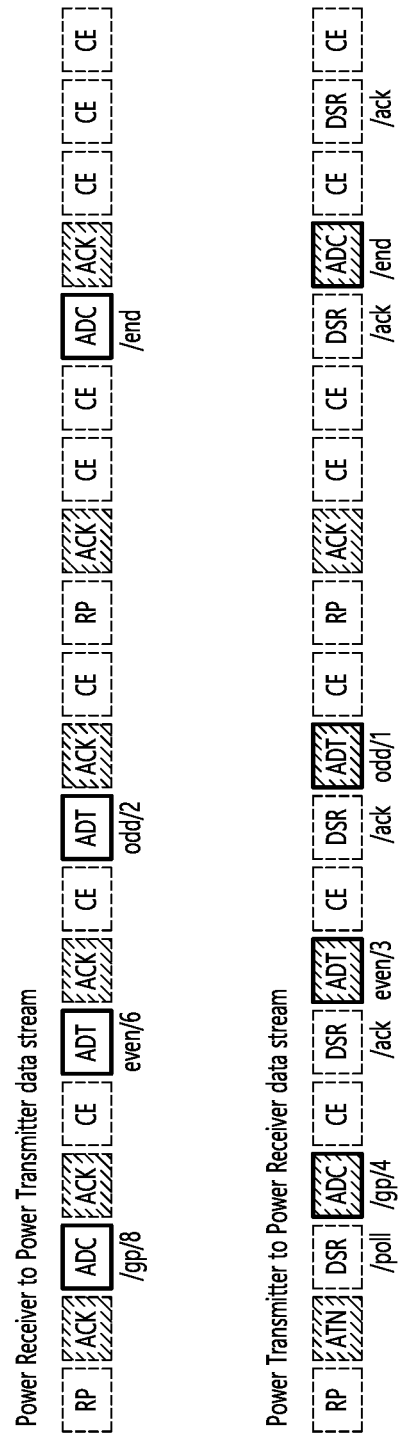
FIG. 15 illustrates an application-level data transmission stream between a wireless power transmitter and a receiver according to an example.

FIG. 15 illustrates an application-level data transmission stream between a wireless power transmitter and a receiver according to an example.

Referring to FIG. 15, a data transport stream may include auxiliary data control (ADC) data packets and/or auxiliary data transport (ADT) data packets.

ADC data packets are used to open a data transport stream. The ADC data packet may indicate the type of message included in the stream and the number of data bytes. ADT data packets, on the other hand, are sequences of data that contain actual messages. When notifying the end of a stream, ADC/end data packets are used. For example, the maximum number of data bytes in a data transport stream may be limited to 2047.

ACK or NAC (NACK) is used to inform whether ADC data packets and ADT data packets are normally received. Between transmission timings of the ADC data packet and the ADT data packet, control information necessary for wireless charging, such as a control error packet (CE) or DSR, may be transmitted.

Using this data transport stream structure, authentication related information (authentication request message, authentication response message) or other application level information can be transmitted and received between the wireless power transmitter and the receiver.

Hereinafter, a method for exchanging authentication-related information between a wireless power transmitter and a wireless power receiver using out-of-band communication will be described.

As described above, in order for the wireless power transmitter and the wireless power receiver to exchange authentication-related information through in-band communication, a data stream structure is used. Among the authentication request message and the authentication response message, there are large-capacity messages that are too large to be transmitted/received through in-band communication having a limited transmission/reception speed. If large-capacity messages are transmitted through in-band communication, considerable time is incurred, on the other hand, the wireless power receiver must transmit Control Error (CE) data packet and Received Power (RP and RP8) data packet to the wireless power transmitter at regular time intervals in the power transmission step. In order to solve this problem, as shown in FIG. 15, a data transport stream is needed that divides the authentication request message and the authentication response message into a plurality of ADT data packets and transmits them.

However, if the wireless power transmitter and the wireless power receiver transmit/receive authentication-related information using out-of-band communication, it may not be necessary to transmit/receive authentication related information using the data transport stream described in FIG. 15.

In particular, when BLUETOOTH® communication is used as out-band communication, there is no need to consider interference with CE packets and RP packets transmitted through in-band communication because there is no concern about interference with in-band communication, since it supports a high transmission speed (e.g., 2 Mbps), authentication-related information can be transmitted/received within a short time.

Figure 16:
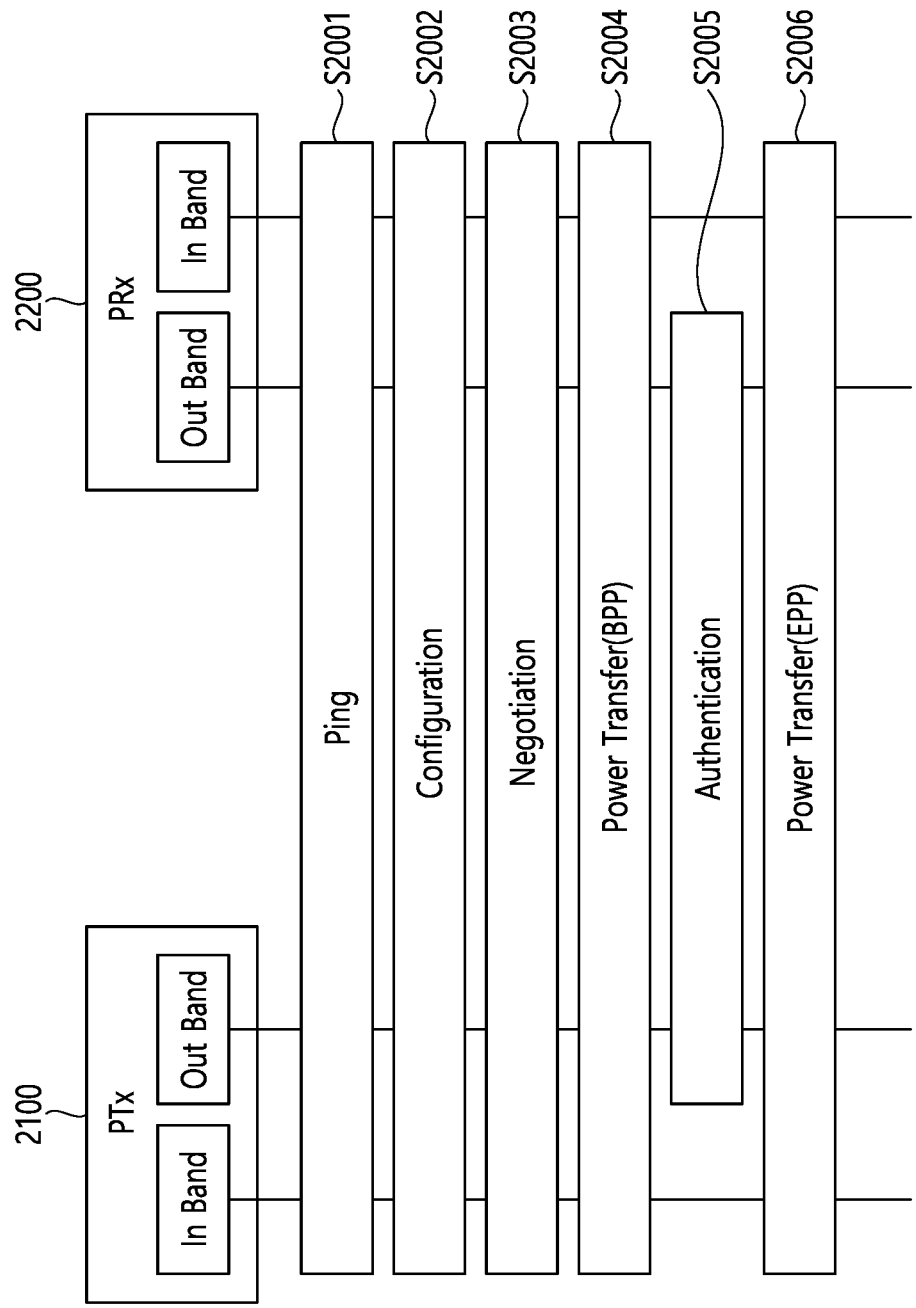
FIG. 16 is a flowchart schematically illustrating a method of performing an authentication phase using out-of-band communication according to an embodiment.

FIG. 16 is a flowchart schematically illustrating a method of performing an authentication phase using out-of-band communication according to an embodiment.

Referring to FIG. 16, the wireless power transmitter 2100 (PTx) and the wireless power receiver 2200 (PRx) go through a ping phase (S2001), a configuration phase (S2002), and a negotiation phase (S2003) before entering a power transfer phase (S2004). Messages required in the ping phase (S2001), configuration phase (S2002), negotiation phase (S2003), and power transfer phase (S2004) are delivered through in-band communication. Since the ping phase (S2001), configuration phase (S2002), negotiation phase (S2003), and power transfer phase (S2004) are the same as/similar to those described in detail with respect to FIG. 5, a detailed description thereof will be omitted.

The wireless power transmitter 2100 and the wireless power receiver 2200 go through at least one of the ping phase (S2001), configuration phase (S2002), negotiation phase (S2003) and power transfer phase (S2004), and make a BLUETOOTH® (e.g., BLE) connection.

In the state where the BLUETOOTH® connection between the wireless power transmitter 2100 and the wireless power receiver 2200 is established, the wireless power transmitter 2100 and the wireless power receiver 2200, which performed power transmission/reception according to BPP (Baseline Power Profile) increase the level of wireless power and perform an authentication phase (S2005) for power transmission/reception according to EPP (Extended Power Profile).

Referring to FIG. 16, in the power transfer phase (S2004) before performing the authentication phase (S2005), low power transmission according to BPP is performed, and in the power transfer phase (S2006) after authentication between the wireless power transmitter 2100 and the wireless power receiver 2200 is successful through the authentication phase (S2005), high power transmission according to EPP can be performed.

The wireless power transmitter 2100 and the wireless power receiver 2200 perform an authentication phase (S2005) and transmit an authentication message required in the authentication phase through BLUETOOTH® communication.

The authentication message includes an authentication request message and an authentication response message.

Figure 17:
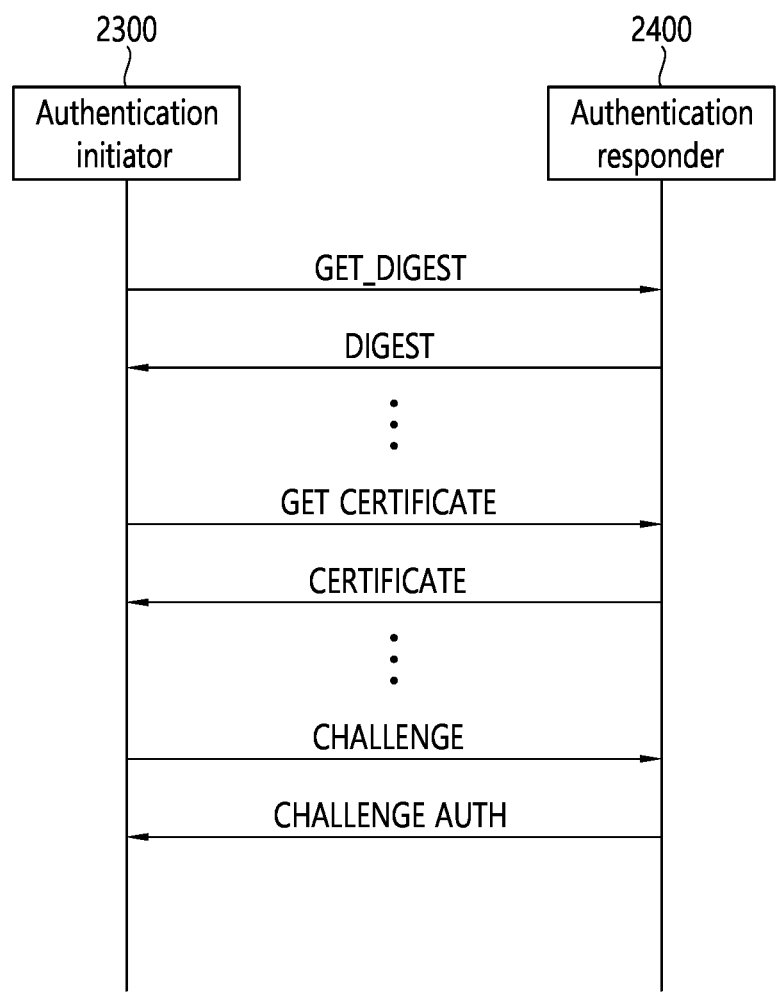
FIG. 17 is a flowchart schematically illustrating an authentication phase according to an embodiment.

FIG. 17 is a flowchart schematically illustrating an authentication phase according to an embodiment.

Referring to FIG. 17, in the authentication phase (S2005), the authentication initiator 2300 transmits an authentication request message to the authentication responder 2400, and the authentication responder 2400 transmits an authentication response message to the authentication initiator 2300.

Referring to FIG. 17, as described with reference to FIGS. 12 to 14, the authentication request message transmitted by the authentication initiator 2300 to the authentication responder 2400 includes GET_DIGESTS, GET_CERTIFICATE, and CHALLENGE, the authentication response message includes DIGESTS, CERTIFICATE, CHALLENGE_AUTH, and ERROR.

GET_DIGESTS (digest request message) is a message requesting certificate chain digests from the authentication responder 2400, GET_CERTIFICATE (certificate request message) is a message requesting a certificate chain from the authentication responder 2400, and CHALLENGE (challenge message) is a message that initiates authentication of the authentication responder 2400. DIGESTS (digest message) is a message that transmits a certificate chain digest to the authentication initiator 2300 in response to GET_DIGESTS, CERTIFICATE (certificate message) is a message that transmits a certificate chain to the authentication initiator 2300 in response to GET_CERTIFICATE, CHALLENGE_AUTH (challenge response message) is a message transmitted to the authentication initiator 2300 in response to CHALLENGE, and ERROR (error message) is an error message transmitted from the authentication responder 2400 to the authentication initiator 2300.

When the wireless power receiver 2200 is the authentication initiator 2300, the wireless power transmitter 2100 functions as the authentication responder 2400, and when the wireless power transmitter 2100 is the authentication initiator 2300, the wireless power receiver 2200 may function as the authentication responder 2400.

The Qi Specification of the Wireless Power Consortium (WPC) defines the format of the authentication message as shown in FIGS. 18 to 24.

FIG. 18 is a diagram illustrating a GET_DIGESTS format, FIG. 19 is a diagram illustrating a GET_CERTIFICATE format, FIG. 20 is a diagram illustrating a CHALLENGE format, FIG. 21 is a diagram showing a DIGESTS format, FIG. 22 is a diagram illustrating a CERTIFICATE format, FIG. 23 is a diagram illustrating a CHALLENGE_AUTH format, and FIG. 24 is a diagram illustrating an ERROR format.

Referring to the format of each authentication message shown in FIGS. 18 to 24, all authentication messages include authentication message header information. The Qi Specification of the Wireless Power Consortium (WPC) defines the Authentication message header as shown in FIGS. 25 and 26.

FIG. 25 is a diagram showing the format of an Authentication message header, FIG. 26 is a table showing explanations on the value and meaning of the Authentication Protocol Version field of the Authentication message header, FIG. 27 is a table showing descriptions of the Message Type field of the Authentication message header of the authentication request message, and FIG. 28 is a table illustrating descriptions of the Message Type field of the Authentication message header of the authentication response message.

Figure 29:
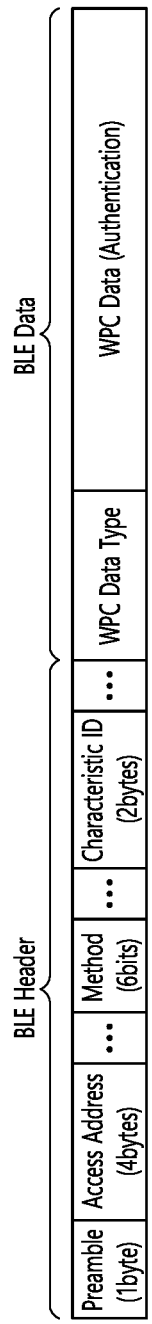
FIG. 29 is a diagram for explaining a method of including an authentication message in a BLE packet.

FIG. 29 is a diagram for explaining a method of including an authentication message in a BLE packet.

As described above, in the method of performing the authentication phase using out-of-band communication according to an embodiment, an authentication message is transmitted through BLUETOOTH® communication.

To this end, the authentication message defined in the Qi Specification of WPC may be included in a BLUETOOTH® packet and transmitted through BLUETOOTH® communication.

Referring to FIG. 29, a BLUETOOTH® packet may include header information (BLE Header) and data information (BLE Data).

Header information may include information on a preamble, an access address, a method, and a characteristic ID.

The header information method may include information for distinguishing a BLUETOOTH® packet transmitted from the wireless power transmitter to the wireless power receiver and a BLUETOOTH® packet transmitted from the wireless power receiver to the wireless power transmitter.

For example, in a BLUETOOTH® packet transmitted from a wireless power receiver (Server) to a wireless power transmitter (Client), the method of header information is marked as Notification, and the BLUETOOTH® packet transmitted from the wireless power transmitter (Client) to the wireless power receiver (Server) may be marked with Write as the method of header information.

The data information of the BLUETOOTH® packet may include an authentication message (WPC Data) defined in the Qi Specification described in FIGS. 18 to 24. Also, referring to FIG. 29, the data information of the BLUETOOTH® packet may further include data type information (WPC Data Type). The data type information may include information indicating the type of data included in the data information of the BLUETOOTH® packet. For example, data type information may have a size of 1 byte, information indicating that the data is authentication-related may be included. The data type information may be, for example, information for distinguishing whether the WPC data included in the data information of the BLUETOOTH® packet is authentication related data or power control related data.

Figure 30:
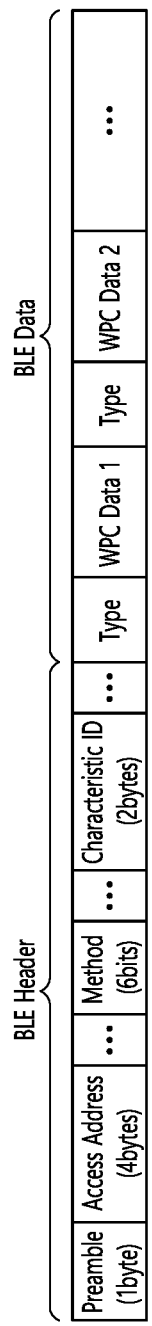
FIG. 30 is a diagram for explaining a method of including a plurality of authentication messages in one BLUETOOTH® packet.

FIG. 30 is a diagram for explaining a method of including a plurality of authentication messages in one BLUETOOTH® packet.

Referring to FIG. 30, data information (BLE Data) of a BLUETOOTH® packet may include a plurality of authentication messages (WPC Data 1, WPC Data 2, etc.) together. In addition, data type information (Type) corresponding to each authentication message (WPC Data 1, WPC Data 2, etc.) may also be included.

Figure 31:
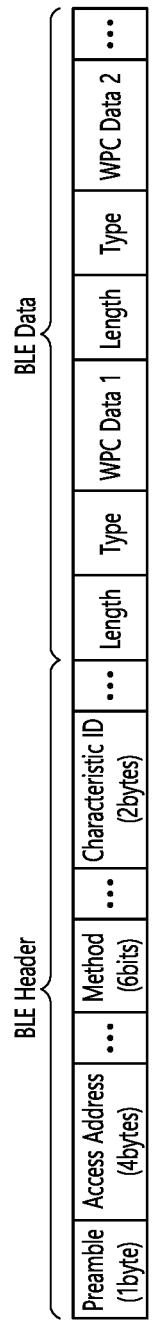
FIG. 31 is a diagram for explaining a method of including a plurality of authentication messages in one BLUETOOTH® packet according to another example.

FIG. 31 is a diagram for explaining a method of including a plurality of authentication messages in one BLUETOOTH® packet according to another example.

Referring to FIG. 31, compared to the BLUETOOTH® packet shown in FIG. 30, length information (Length) is further included in the data information (BLE Data) of the BLUETOOTH® packet. The length information may be information indicating information about the length of each authentication message (WPC Data 1, WPC Data 2, etc.). Length information may have a size of 1 byte.

When a plurality of authentication messages are included in one BLUETOOTH® packet and transmitted, authentication request messages or authentication response messages can be transmitted/received as one BLUETOOTH® packet, it can simplify the authentication phase, the time required for authentication can be shortened and power consumption can be reduced.

Figure 32:
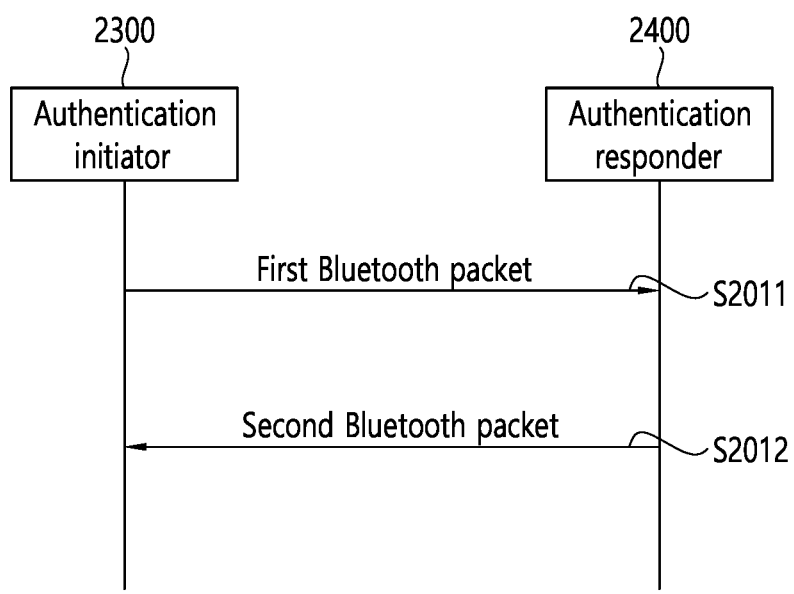
FIG. 32 is a flowchart for explaining an authentication procedure when a plurality of authentication messages are included in one BLUETOOTH® packet.

FIG. 32 is a flowchart for explaining an authentication procedure when a plurality of authentication messages are included in one BLUETOOTH® packet.

The authentication initiator 2300 may include authentication request messages in a first BLUETOOTH® packet and transmit the authentication request messages to the authentication responder 2400 through BLUETOOTH® communication. For example, the first BLUETOOTH® packet may include GET_CERTIFICATE and CHALLENGE or GET_DIGESTS and CHALLENGE. Alternatively, GET_DIGESTS, GET_CERTIFICATE, and CHALLENGE may be included in the first BLUETOOTH® packet.

The authentication responder 2400 may include authentication response messages in a second BLUETOOTH® packet as a response to the first BLUETOOTH® packet and transmit the authentication response messages to the authentication initiator 2300 through BLUETOOTH® communication. For example, CERTIFICATE and CHALLENGE_AUTH may be included in the second BLUETOOTH® packet, or DIGESTS and CHALLENGE_AUTH may be included.

Alternatively, the second BLUETOOTH® packet may include DIGESTS, CERTIFICATE, and CHALLENGE_AUTH.

According to WPC's Qi Specification, if the authentication initiator does not cache the authentication responder's DIGEST, for authentication of the wireless power receiver and the wireless power transmitter, 1) the authentication initiator transmits GET_CERTIFICATE, 2) authentication responder transmits CERTIFICATE, 3) authentication initiator transmits CHALLENGE, and 4) authentication responder transmits CHALLENGE_AUTH.

On the other hand, in the authentication procedure according to FIG. 32, since 1) The authentication initiator 2300 includes GET_CERTIFICATE and CHALLENGE in the first BLUETOOTH® packet and transmits it to the authentication responder 2400, 2) the authentication responder 2400 includes CERTIFICATE and CHALLENGE_AUTH in the second BLUETOOTH® packet and transmits it to the authentication initiator 2300, the authentication process can be performed in two stages.

Hereinafter, a method of performing authentication of a wireless power transmitter and a wireless power receiver using a third device (remote control device and server) will be described.

The remote control device 2500 is capable of BLUETOOTH® communication with the wireless power transmitter 2100 and/or wireless power receiver 2200, and wireless communication with the server 2600 such as the Internet and WI-fi.

According to an example, the remote control device 2500 receives a certificate of the wireless power receiver 2200 from the server 2600, and the authentication phase (S2026) may be performed through BLUETOOTH® communication with the wireless power transmitter 2100 using the received certificate of the wireless power receiver 2200.

If authentication is successful in the authentication phase (S2026), the wireless power transmitter 2100 provides wireless power to the wireless power receiver 2200 (S2027).

Figure 33:
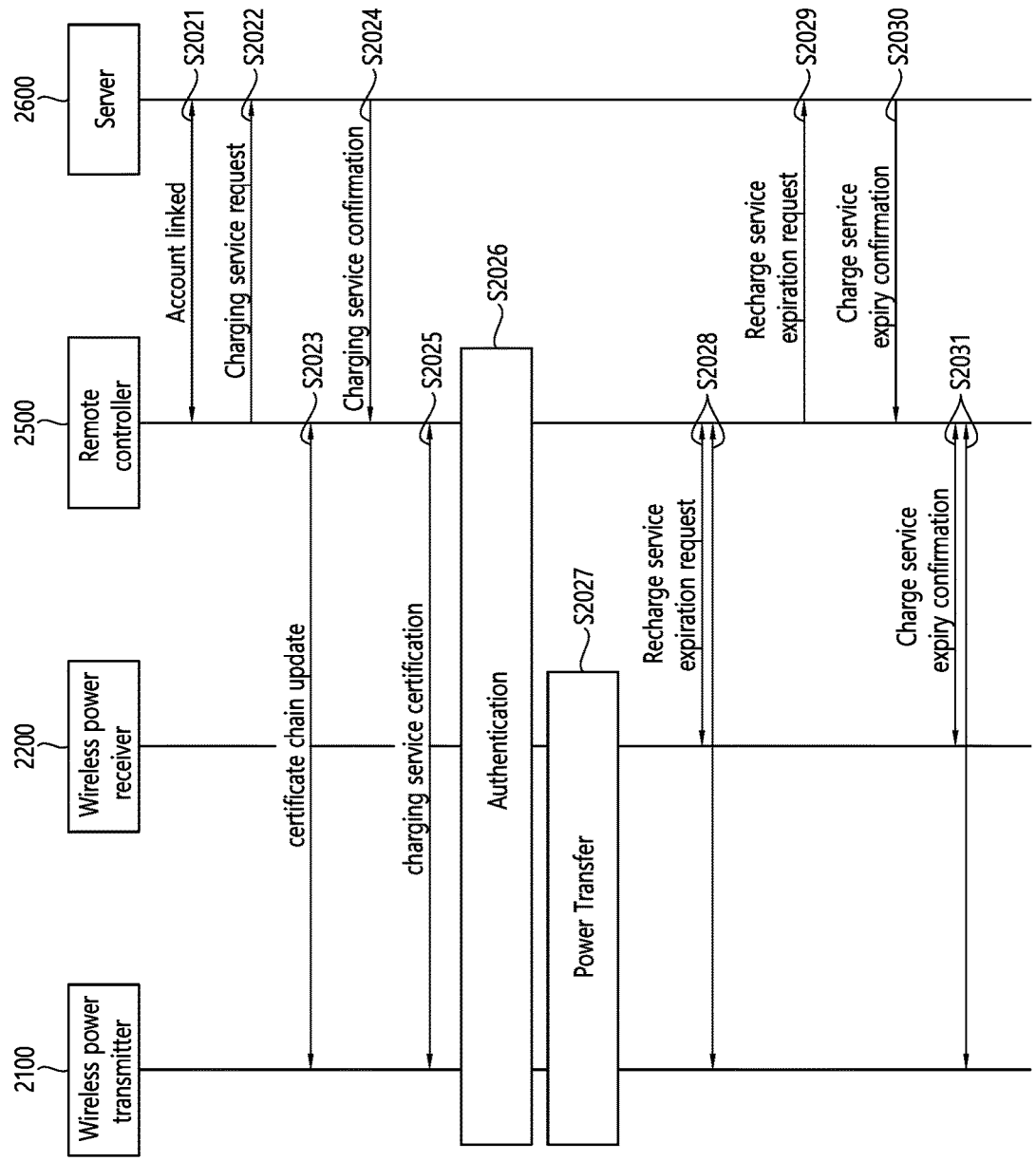
FIG. 33 is a flowchart illustrating an authentication method according to an example.

In the above method, when it is difficult for the wireless power receiver 2200 to perform direct authentication with the wireless power transmitter 2100, for example, when the hardware of the wireless power receiver 2200 is poor or the BLUETOOTH® connection between the wireless power receiver 2200 and the wireless power transmitter 2100 is impossible or difficult, it can be a useful authentication method. Alternatively, in a charging service using the server 2600, such as a paid charging service, it can be a useful authentication method in an environment where it is difficult for the wireless power receiver 2200 to communicate directly with the server 2600. FIG. 33 is a flowchart illustrating an authentication method according to an example.

Referring to FIG. 33, the user may link an account with the server 2600 using the remote control device 2500 (S2021). The remote control device 2500 may be a device capable of communicating with the server 2600, such as a mobile phone or a laptop computer, and communicating with the wireless power transmitter 2100 and/or the wireless power receiver 2200.

Account linkage may mean that the remote control device 2500 transmits account information to the server 2600 and receives normal confirmation of the account information from the server 2600. Account information is an account ID and password, or may mean information capable of identifying the user of the remote control device 2500, the remote control device 2500, or the user of the wireless power receiver 2200 in the other server 2600.

After the account linkage is completed, the user requests a charging service from the server 2600 using the remote control device 2500 (S2022), and receives a confirmation of the charging service from the server 2600 (S2024).

The remote control device 2500 recognizes the wireless power receiver 2200 and/or the wireless power transmitter 2100 located nearby using a method using RSSI signal strength, etc., and it can determine the wireless power receiver 2200 to provide charging service and the wireless power transmitter 2100 to be charged.

The remote control device 2500 receives the certificate chain of the charging target (wireless power receiver 2200) from the server 2600, the received certificate chain is transmitted to the wireless power transmitter 2100 to update the certificate chain of the wireless power receiver 2200 (S2023). The remote control device 2500 receives the certificate chain of the wireless power transmitter 2100 from the server 2600, the received certificate chain may be transmitted to the wireless power transmitter 2100 to update the certificate chain of the wireless power transmitter 2100 (S2023). Step S2023 is performed after account linking, may be performed before step S2022 or step S2024, or may be performed after step S2022 or step S2024.

After step S2024, the remote control device 2500 may notify the wireless power transmitter 2100 that it has received a confirmation for the charging service from the server 2600 (S2025).

Thereafter, the remote control device 2500 performs an authentication phase (S2026) with the wireless power transmitter 2100 using the certificate chain received from the server 2600. The authentication message required in the authentication phase (S2026) is transmitted/received through in-band communication, or similarly to the above-described FIGS. 16 to 32, it can be transmitted/received through BLUETOOTH® communication between the remote control device 2500 and the wireless power transmitter 2100.

When the authentication phase (S2026) is normally completed, the wireless power transmitter 2100 provides wireless power to the wireless power receiver 2200 (S2027).

When the remote control device 2500 receives a message requesting expiration of the charging service from the wireless power transmitter 2100 or the wireless power receiver 2200 (S2028), the remote control device 2500 transmits a message requesting expiration of the charging service to the server 2600 (S2029).

When the remote control device 2500 receives a message notifying the charging service expiration confirmation from the server 2600 (S2030), the remote control device 2500 transmits a message notifying the charging service expiration confirmation to the wireless power transmitter 2100 or wireless power receiver 2200 that has requested the expiration of the charging service (S2031), the charging service for the wireless power receiver 2200 is terminated.

Meanwhile, according to another example, the remote control device 2500 receives the certificate of the wireless power receiver 2200 from the server 2600, the received certificate of the wireless power receiver 2200 may be transmitted to the wireless power receiver 2200 so that the certificate of the wireless power receiver 2200 is updated.

This method can be a useful authentication method in an environment where it is difficult for the wireless power receiver 2200 to directly receive and update a certificate required for wireless charging from the server 2600.

Figure 34:
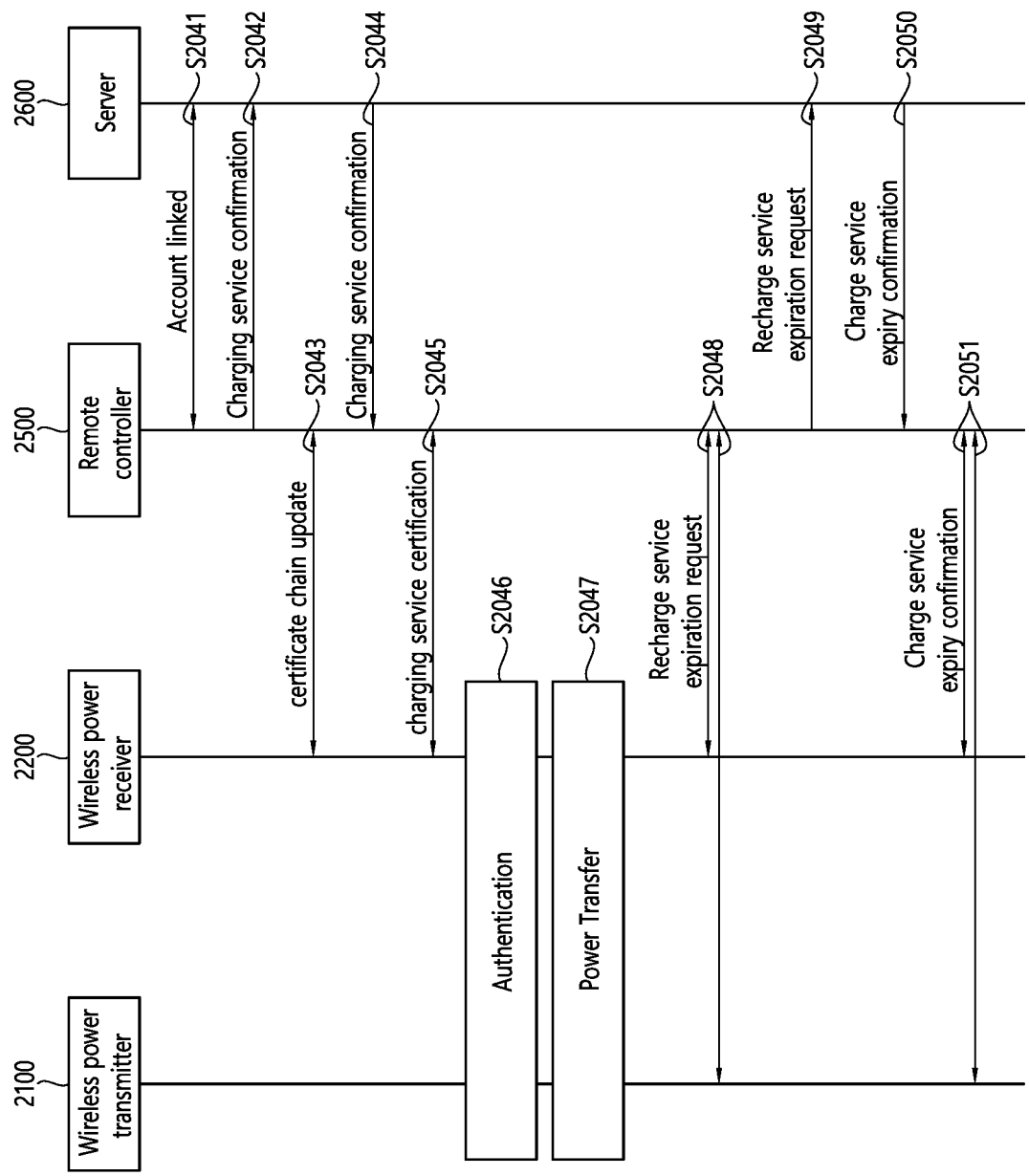
FIG. 34 is a flowchart for explaining an authentication method according to another example.

FIG. 34 is a flowchart for explaining an authentication method according to another example.

Steps S2041, S2042, and S2044 of FIG. 34 are the same as those of steps S2021, S2022, and S2024 of FIG. 33, and thus descriptions thereof are omitted.

The remote control device 2500 receives the certificate chain of the charging target (wireless power receiver 2200) from the server 2600, the received certificate chain is transmitted to the wireless power receiver 2200 to update the certificate chain (S2043). Step S2043 proceeds after linking accounts, it may proceed before step S2042 or S2044, or after step S2042 or S2044.

After step S2044, the remote control device 2500 may notify the wireless power receiver 2200 that it has received a confirmation for the charging service from the server 2600 (S2045).

Thereafter, the wireless power receiver 2200 performs an authentication phase (S2046) with the wireless power transmitter 2100 using the certificate chain updated through the remote control device 2500. The authentication message required in the authentication phase (S2046) is transmitted/received through in-band communication, or similar to the above-described FIGS. 16 to 32, it may be transmitted/received through BLUETOOTH® communication between the wireless power receiver 2200 and the wireless power transmitter 2100.

When the authentication phase (S2046) is normally completed, the wireless power transmitter 2100 provides wireless power to the wireless power receiver 2200 (S2047).

Since steps S2048, S2049, S2050, and S2051 are the same as those of steps S2028, S2029, S2030, and S2031 of FIG. 33, descriptions thereof are omitted.

Figure 35:
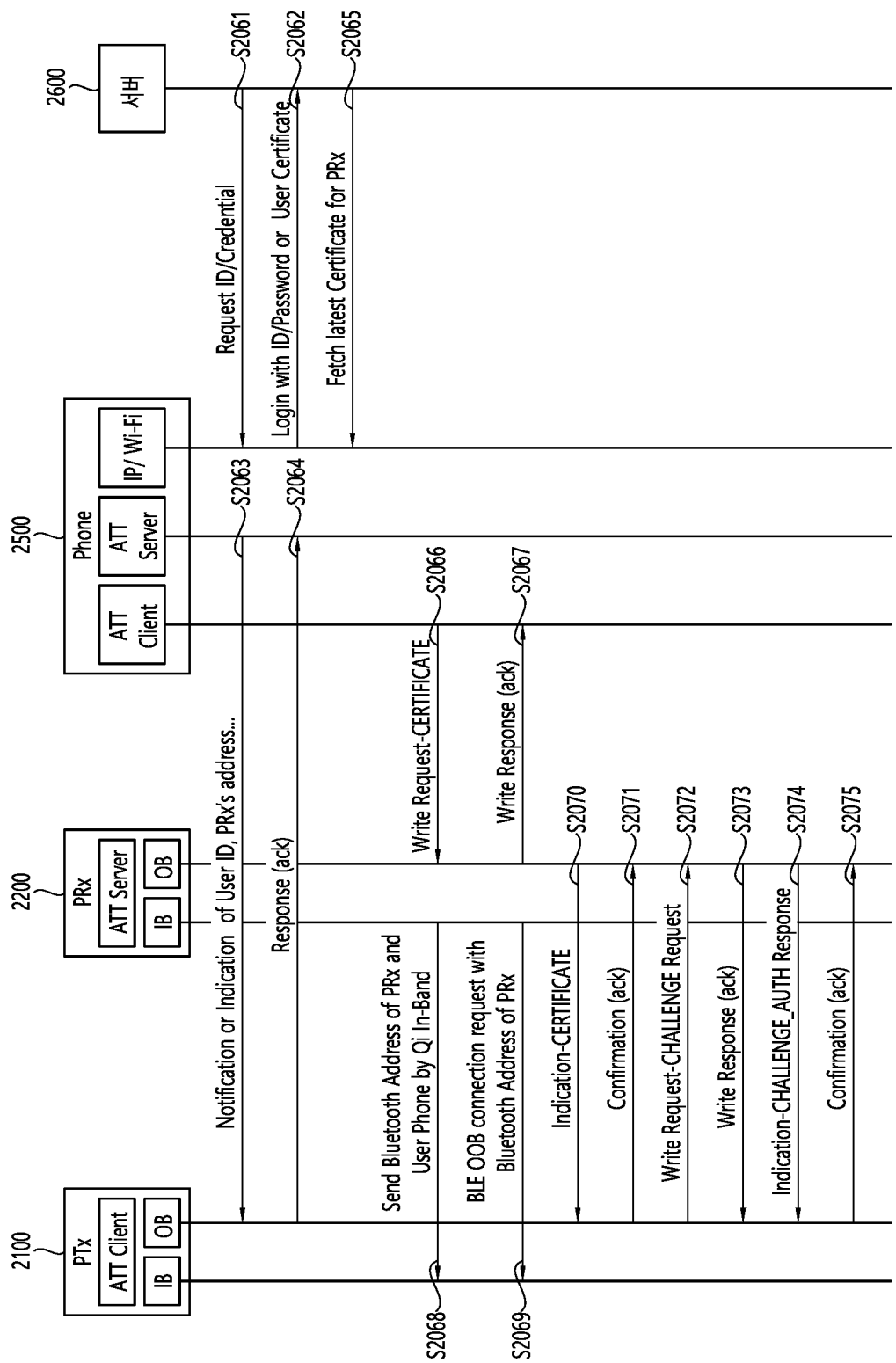
FIG. 35 is a flowchart for explaining an authentication method according to another example.

FIG. 35 is a flowchart for explaining an authentication method according to another example.

Referring to FIG. 35, the remote control device 2500 is capable of BLUETOOTH® communication with the wireless power transmitter 2100 and/or the wireless power receiver 2200, wireless communication such as the server 2600 and Internet, WI-fi is possible. The remote control device 2500 can communicate with the server 2600 such as a mobile phone or a laptop computer, it may be a device capable of communicating with the wireless power transmitter 2100 and/or the wireless power receiver 2200.

The wireless power transmitter 2100 can operate as an ATT client for the wireless power receiver 2200 and the remote controller 2500, the wireless power receiver 2200 can operate as an ATT server for the wireless power transmitter 2100 and the remote controller 2500, the remote control device 2500 may operate as an ATT server for the wireless power transmitter 2100 and an ATT client for the wireless power receiver 2200.

The server 2600 requests identification information from the remote controller 2500 (S2061). The identification information may be information such as an ID and a password, or information capable of identifying a user of the remote control device 2500, the user of the remote control device 2500, or the user of the wireless power receiver 2200 in the server 2600, such as a credential.

The user transmits identification information to the server 2600 through the remote control device 2500 (S2062).

The server 2600 specifies the user of the remote controller device 2500, the remote controller device 2500 or the user of the wireless power receiver 2200 based on the received identification information, the latest certificate for the wireless power receiver 2200 is transmitted (S2065).

Meanwhile, the remote control device 2500 transmits wireless charging identification information required for wireless charging of the wireless power receiver 2200 to the wireless power transmitter 2100 through BLUETOOTH® communication (S2063). The wireless charging identification information may be a user ID, address information of the wireless power receiver 2200, and the like.

When the wireless power transmitter 2100 identifies a wireless charging user or a wireless charging target through the wireless charging identification information, a response (ACK) is transmitted to the remote controller 2500 through BLUETOOTH® communication (S2064).

Steps S2063 and S2064 may proceed simultaneously with steps S2061, S2062 and/or S2065.

The remote control device 2500 transmits the certificate of the wireless power receiver 2200 received in step S2065 to the wireless power receiver 2200 through BLUETOOTH® communication (S2066).

The wireless power receiver 2200 may receive the certificate normally and transmit a response (ACK) informing of this to the remote control device 2500 (S2067).

Meanwhile, the wireless power receiver 2200 transmits the BLUETOOTH® address of the wireless power receiver

2200 to the wireless power transmitter 2100 through in-band communication with the wireless power transmitter 2100 (S2068). The wireless power receiver 2200 may also transmit the BLUETOOTH® address of the remote control device 2500.

Thereafter, the wireless power receiver 2200 requests a BLUETOOTH® (out-band communication) connection with the wireless power transmitter 2100 through in-band communication with the wireless power transmitter 2100 (S2069), a BLUETOOTH® connection with the wireless power transmitter 2100 may be established.

In addition, the wireless power receiver 2200 performs authentication for wireless charging with the wireless power transmitter 2100 using the certificate received from the remote control device 2500 in step S2066. An authentication message required in the authentication process may be transmitted/received through BLUETOOTH® communication similarly to that described in FIGS. 16 to 32.

According to one example, the wireless power receiver 2200 may transmit the certificate received from the remote control device 2500 in step S2066 to the wireless power transmitter 2100 through BLUETOOTH® communication established through steps S2068 and S2069 (S2070).

The wireless power transmitter 2100 may normally receive the certificate and transmit a response (ACK) indicating this to the wireless power receiver 2200 (S2071).

According to an embodiment, before step S2070, the wireless power transmitter 2100 may transmit a certificate request message (GET_CERTIFICATE) requesting a certificate to the wireless power receiver 2200 through BLUETOOTH® communication, the wireless power receiver 2200 may perform step S2070 after normally receiving the certificate request message and transmitting a response (ACK) indicating this to the wireless power transmitter 2100.

After receiving the certificate from the wireless power receiver 2200, the wireless power transmitter 2100 may transmit a CHALLENGE to the wireless power receiver 2200 through BLUETOOTH® communication (S2072). The wireless power receiver 2200 may receive the CHALLENGE normally and transmit a response (ACK) indicating this to the wireless power transmitter 2100 (S2073).

The wireless power receiver 2200 may transmit CHALLENGE_AUTH to the wireless power transmitter 2100 through BLUETOOTH® communication in response to CHALLENGE (S2074). The wireless power transmitter 2100 may normally receive CHALLENGE_AUTH and transmit a response (ACK) indicating this to the wireless power receiver 2200 (S2075).

Thereafter, after the wireless power transmitter 2100 successfully completes authentication of the wireless power receiver 2200, the wireless power transmitter 2100 provides a wireless charging service to the wireless power receiver 2200.

While wireless charging is provided, the wireless power transmitter 2100 or the wireless power receiver 2200 may transmit information about the cost of wireless charging service, charging speed, battery charging state, expected time required to fully charge, etc. to the remote control device 2500 through BLUETOOTH® communication.

Hereinafter, an authentication method using both in-band communication and out-band communication will be described.

In the wireless power transmitter and the wireless power receiver capable of both in-band and out-of-band communication, a communication mode to be used in a wireless charging process may be determined by a user.

For example, a user may select a communication mode used in a wireless charging process through a user interface of a wireless power transmitter and/or a wireless power receiver. The communication mode is provided as a first mode using only in-band communication, a second mode using both in-band communication and out-band communication, and a third mode using only out-band communication, as out-of-band communication, an additional mode may be provided depending on which communication among BLUETOOTH® and NFC is to be used.

While the user selects the first mode or the second mode and the authentication phase proceeds with in-band communication, if renewal of authentication information of wireless power receiver or wireless power transmitter is required, for example, when the validity period of the certificate expires or the version of the certificate is inconsistent, after the wireless power receiver or wireless power transmitter renews the authentication information, updated authentication information may be transmitted through out-of-band communication. In this case, since newly updated authentication information is transmitted through out-of-band communication, authentication can be completed within a short time.

Meanwhile, through in-band communication, the authentication initiator transmits GET_DIGESTS to the authentication responder, and the authentication responder transmits DIGESTS in response, if received DIGESTS are not cached, the authentication initiator and the authentication responder may perform the authentication process by switching to out-of-band communication.

If the received DIGESTS are not cached in the authentication initiator, the authentication initiator must send GET_CERTIFICATE and the authentication responder must send CERTIFICATE as a response, it takes several minutes to transmit CERTIFICATE through in-band communication.

Therefore, if the received DIGESTS are not cached, the authentication initiator and authentication responder switch the authentication process to out-of-band communication, the authentication responder can transmit CERTIFICATE through out-of-band communication so that authentication can proceed and be completed within a short time.

After CERTIFICATE is transmitted/received via out-of-band communication, CHALLENGE and/or CHALLENGE_AUTH may be transmitted/received again through in-band communication, or CHALLENGE and/or CHALLENGE_AUTH may also be transmitted/received through out-band communication.

Meanwhile, during the authentication phase through in-band communication, when normal transmission and/or reception of an authentication message is not performed due to a defect in in-band communication, the authentication initiator and the authentication responder may perform an authentication process by switching to out-of-band communication.

During the authentication phase through in-band communication, the communication mode may be reset using renegotiation so that out-band communication is switched to proceed with the authentication phase for the reasons described above.

For example, to switch the communication mode to out-of-band, the wireless power transmitter and the wireless power receiver enter a re-negotiation phase, and after switching a communication mode to out-of-band in the re-negotiation phase, an authentication phase may proceed. At this time, in the re-negotiation phase, the communication mode is forcibly switched to a mode that can use out-of-band, or it presents a user interface to the user to select a communication mode, a message prompting the user to select a communication mode in which an out-of-band can be used may be displayed together.

Hereinafter, a method of changing a lock release method of a wireless power receiver during wireless charging will be described.

Currently, smartphones sold on the market support various unlocking methods. As the unlocking method, there are fingerprint recognition through the front and/or back of the smartphone, face recognition using a camera, dot pattern, personal identification number (PIN), and the like.

However, in order to wirelessly charge the smart phone, the rear surface of the smart phone should be placed in contact with one side of the wireless power transmitter. Therefore, the smartphone cannot be unlocked using the fingerprint recognition method through the back of the smartphone during wireless charging.

Therefore, users who use fingerprint recognition through the back of the smartphone as a method of unlocking the smartphone cause inconvenience in that, in order to unlock the lock during wireless charging, it is necessary to pick up the smartphone again, perform fingerprint recognition on the back side, and place the smartphone on the wireless power transmission device again.

In order to solve this inconvenience, a method of changing the unlocking method of the wireless power receiver during wireless charging is proposed.

Figure 36:
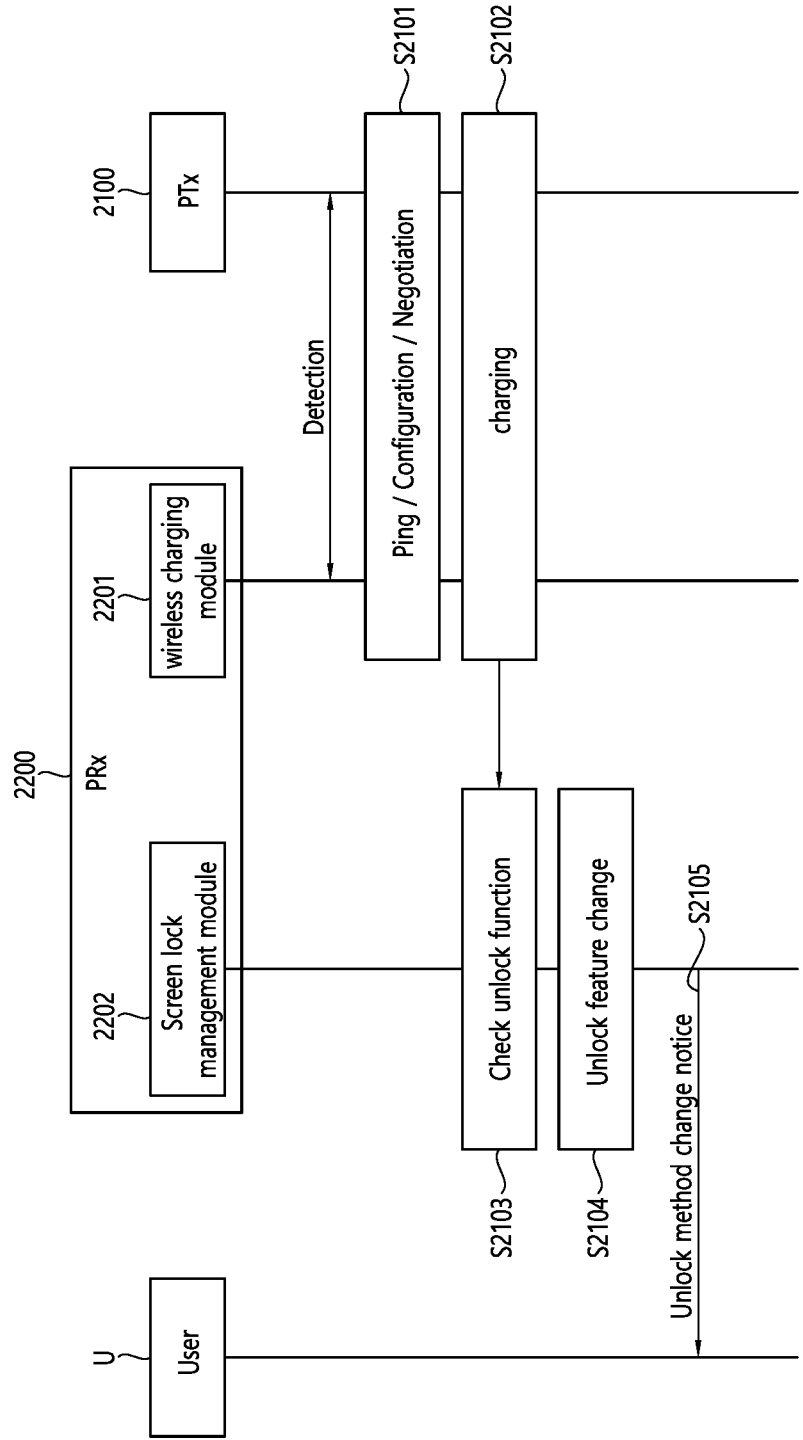
FIG. 36 is a flowchart illustrating a method of unlocking a wireless power receiver during wireless charging according to an example.

FIG. 36 is a flowchart illustrating a method of unlocking a wireless power receiver during wireless charging according to an example.

Referring to FIG. 36, the wireless power receiver 2200 includes a wireless charging module 2201 and a screen lock management module 2202. The wireless power receiver 2200 refers to a device capable of wireless charging, such as a smart phone, tablet, or laptop, providing a screen lock function.

When the wireless power receiver 2200 is seated on the wireless power transmitter 2100, detection of the wireless power receiver 2200 proceeds, the wireless charging module 2201 of the wireless power receiver 2200 proceeds with a ping phase (Ping) and a configuration phase (Configuration), if EPP is supported, a negotiation phase (Negotiation) is performed (S2101).

Thereafter, wireless charging proceeds between the wireless power transmitter 2100 and the wireless power receiver 2200 (S2102).

When wireless charging proceeds, the screen lock management module 2202 of the wireless power receiver 2200 checks the unlock function of the wireless power receiver 2200 (S2103).

The screen lock management module 2202 checks an activated unlocking method among unlocking methods supported by the wireless power receiver 2200, and checks whether a unlocking method that cannot be used during wireless charging is activated.

If the currently active unlock method is an unlock method that cannot be used during wireless charging, the screen lock management module 2202 changes the lock release method so that a lock release method that can be used during wireless charging is activated among lock release methods supported by the wireless power receiver 2200 (S2104). The screen lock management module 2202 may switch a lock release method that cannot be used during wireless charging to an inactive state.

For example, when the activated unlocking method confirmed in step S2103 is a fingerprint recognition method through the back of the wireless power receiver 2200, the screen lock management module 2202 can activate a lock release method previously set by the user among face recognition using the front camera of the wireless power receiver 2200, fingerprint recognition through the front of the wireless power receiver 2200, dot pattern, and personal identification number (PIN).

And, the screen lock management module 2202 informs the user U that the unlocking method has been changed (S2104). The screen lock management module 2202 may visually or audibly notify that the lock release method has been changed through the user interface of the wireless power receiver 2200.

Figure 37:
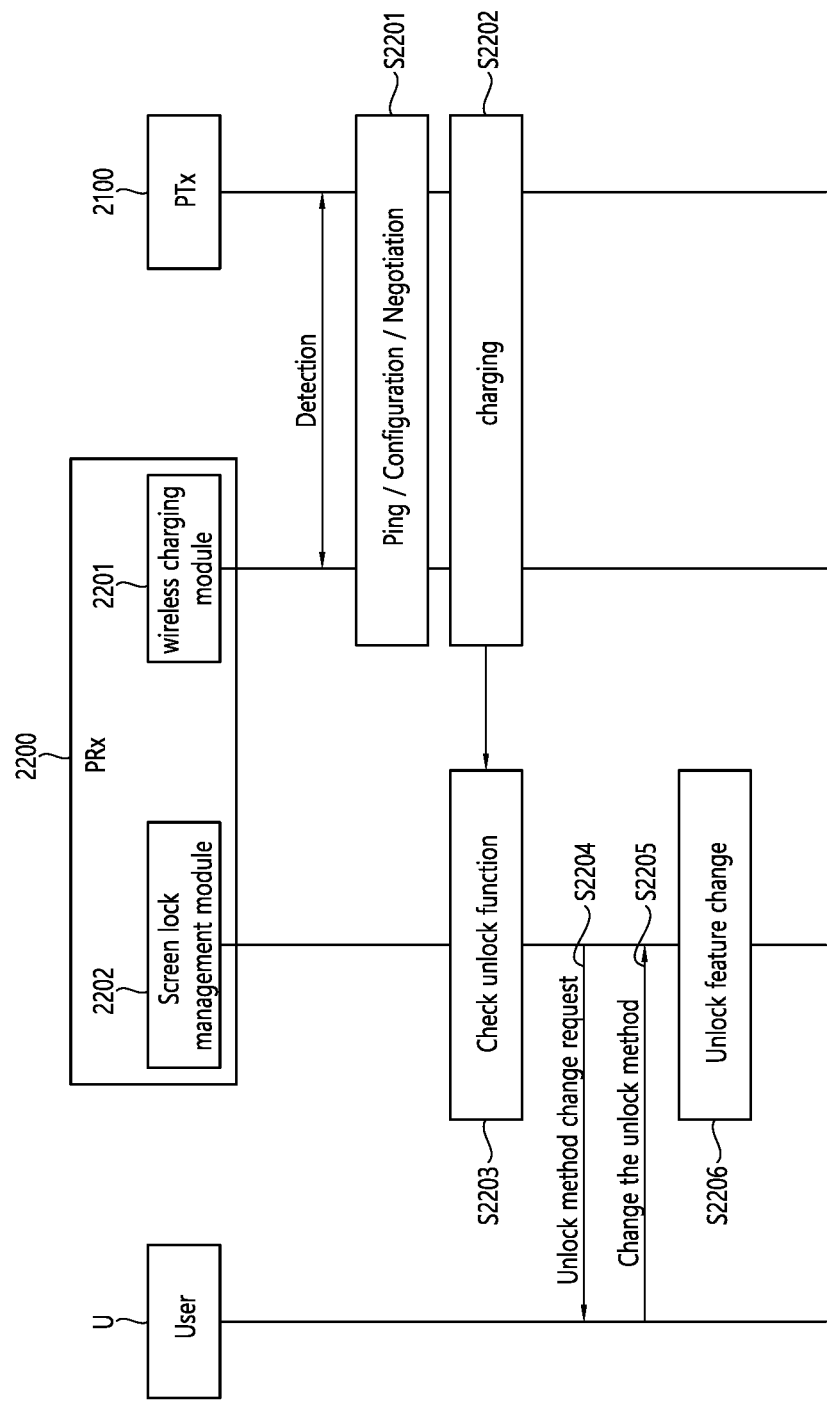
FIG. 37 is a flowchart illustrating a method of unlocking a wireless power receiver during wireless charging according to another example.

FIG. 37 is a flowchart illustrating a method of unlocking a wireless power receiver during wireless charging according to another example.

Steps S2201, S2202, and S2203 of FIG. 37 are the same as steps S2101, S2102, and S2103, respectively, and thus descriptions thereof are omitted.

If the currently active unlock method is an unlock method that cannot be used during wireless charging, the screen lock management module 2202 requests the user U to change the unlock method (S2204). The screen lock management module 2202 may visually or aurally request a lock release method change through the user interface of the wireless power receiver 2200. The screen lock management module 2202 may expose a message to the user to induce the user to select a unlock method that can be used while maintaining wireless charging.

When the user provides an input for changing the unlock method (S2205), the screen lock management module 2202 changes the unlock method to the unlock method selected by the user (S2206).

The embodiment according to FIG. 37 may be used when there is no lock release method previously set by the user among lock release methods usable during wireless charging in the embodiment according to FIG. 36.

Hereinafter, a method of transmitting state information of a wireless power transmitter to a wireless power receiver through out-of-band communication will be described.

In the conventional wireless power receiver and wireless power transmitter, even if the wireless power transmitter has an error (exceeding the allowable temperature, presence of foreign matter, charging error, etc.), only after the wireless power receiver is seated in the wireless power transmitter, it can be confirmed that an error exists in the wireless power transmitter (error confirmation through wireless charging interruption, error notification, etc.).

Out-of-band communication (e.g., BLUETOOTH®) between the wireless power receiver and the wireless power transmitter enables communication connection even if the wireless power receiver is not seated in the wireless power transmitter.

Therefore, even before being settled in the wireless power transmitter, the wireless power receiver establishes an out-of-band communication connection with the wireless power transmitter through Advertising, with out-of-band communication connected, the wireless power transmitter reports status information to the wireless power receiver through out-of-band communication, a state of the wireless power transmitter may be checked before the wireless power receiver is seated in the wireless power transmitter.

The wireless power transmitter may transmit, as status information, information on temperature, foreign object detection, actual DC Volt, actual DC current, etc. to the wireless power receiver through out-of-band communication.

The wireless power receiver displays the received state information of the wireless power transmitter through a user-readable means such as a display, so that the status of the wireless power transmitter can be grasped.

In addition, when the wireless power transmitter includes a plurality of transmission coils to provide wireless power to a plurality of wireless power receivers, the wireless power transmitter may transmit state information for each coil to the wireless power receiver through out-of-band communication.

In this case, the user of the wireless power receiver can identify usable transmission coils based on state information received from the wireless power transmitter. In addition, the user of the wireless power receiver may grasp the charging state or charging error state of other wireless power receivers being charged in the wireless power transmitter as well as the state of the wireless power transmitter.

The wireless power transmitter in the embodiment according to the above-described FIGS. 16 to 37 corresponds to the wireless power transmitter, wireless power transmitter, or power transmitter disclosed in FIGS. 1 to 15. Therefore, the operation of the wireless power transmitter in this embodiment is implemented by one or a combination of two or more of the respective components of the wireless power transmitter in FIGS. 1 to 15. For example, transmission/reception of data packets through in-band communication and/or out-of-band communication by the wireless power transmitter, control based on the received data packets, etc. may be performed by communication/control circuitry 120, communication circuitry 790 and/or control circuitry 710.

In addition, the wireless power receiver in the embodiment according to FIGS. 16 to 37 described above corresponds to the wireless power receiver or wireless power receiver or power receiver disclosed in FIGS. 1 to 15. Therefore, the operation of the wireless power receiver in this embodiment is implemented by one or a combination of two or more of the respective components of the wireless power receiver in FIGS. 1 to 15. For example, transmission/reception of data packets through in-band communication and/or out-band communication by the wireless power receiver, control based on the received data packets, etc. may be performed by communication/control circuitry 220, communication circuitry 890 and/or control circuitry 810.

Since all components or steps are not essential for the wireless power transmission method and apparatus, or the reception apparatus and method according to the embodiment of the present document described above, an apparatus and method for transmitting power wirelessly, or an apparatus and method for receiving power may be performed by including some or all of the above-described components or steps. In addition, the above-described wireless power transmission apparatus and method, or the embodiment of the reception apparatus and method may be performed in combination with each other. In addition, each of the above-described components or steps is not necessarily performed in the order described, and it is also possible that the steps described later are performed before the steps described earlier.

The above description is merely illustrative of the technical idea of the present document, those of ordinary skill in the art to which the present document pertains will be able to make various modifications and variations without departing from the essential characteristics of the present document. Accordingly, the embodiments of the present document described above may be implemented separately or in combination with each other.

Accordingly, the embodiments disclosed in the present document are not intended to limit the technical spirit of the present document, but to explain, and the scope of the technical spirit of the present document is not limited by these embodiments. The protection scope of the present document should be construed by the following claims, all technical ideas within the scope equivalent thereto should be construed as being included in the scope of the present document.

What is claimed is:

1. A method for transferring wireless power to a wireless power receiver, the method performed by a wireless power transmitter, which supports in-band communication using an operating frequency and out-band communication using another operating frequency different from the operating frequency, and comprising:

receiving, from the wireless power receiver in a configuration phase via the in-band communication, a configuration packet for the wireless power receiver, wherein the configuration packet includes an out-band flag informing whether the out-band communication is supported or not;

transmitting, to the wireless power receiver in a negotiation phase via the in-band communication, a capability packet for the wireless power transmitter; and entering a power transfer phase after the negotiation phase, after the negotiation phase, performing an authentication via the out-band communication, wherein the wireless power transmitter transmits an out-band packet via the out-band communication, wherein the out-band packet includes a plurality of Qi data and information for each of the plurality of Qi data, and wherein each of the information specifies a length for each of the plurality of Qi data.

2. The method of claim 1, wherein the wireless power transmitter transmits an authentication message, wherein the authentication message includes an authentication response message that is a response to an authentication request message transmitted from the wireless power receiver to the wireless power transmitter, wherein the authentication response message includes at least one of a digest message (DIGESTS) which transmits certificate chain digests, a certificate message (CERTIFICATE) which transmits a certificate chain, a challenge response message (CHALLENGE_AUTH), and an error message (ERROR).

3. The method of claim 1, wherein the wireless power transmitter transmits an authentication message, wherein the authentication message includes an authentication request message requesting a response from the wireless power receiver, wherein the authentication request message includes at least one of a digest request message (GET_DIGESTS) requesting certificate chain digests, a certificate request message (GET_CERTIFICATE) requesting a certificate chain, and a challenge message (CHALLENGE) initiating authentication of the wireless power transmitter.

4. A method for receiving wireless power from a wireless power transmitter, the method performed by a wireless power receiver, which supports in-band communication using an operating frequency and out-band communication using another operating frequency different from the operating frequency, and comprising:

transmitting, to the wireless power transmitter in a configuration phase via the in-band communication, a configuration packet for the wireless power receiver,
wherein the configuration packet includes an out-band flag informing whether the out-band communication is supported or not;
receiving, from the wireless power transmitter in a negotiation phase via the in-band communication, a capability packet for the wireless power transmitter; and
entering a power transfer phase after the negotiation phase,
after the negotiation phase, performing an authentication via the out-band communication,
wherein the wireless power receiver receives an out-band packet via the out-band communication,
wherein the out-band packet includes a plurality of Qi data and information for each of the plurality of Qi data, and
wherein each of the information specifies a length for each of the plurality of Qi data.

5. The method of claim 4, wherein the wireless power receiver receives an authentication message,
wherein the authentication message includes an authentication request message requesting a response from the wireless power transmitter,
wherein the authentication request message includes at least one of a digest request message (GET_DIGESTS) requesting certificate chain digests, a certificate request message (GET_CERTIFICATE) requesting a certificate chain, a challenge message (CHALLENGE) initiating authentication of the wireless power transmitter.

6. The method of claim 4, wherein the wireless power transmitter transmits an authentication message,
wherein the authentication message includes an authentication response message that is a response to an authentication request message transmitted from the wireless power receiver to the wireless power transmitter,
wherein the authentication response message includes at least one of a digest message (DIGESTS) which transmits certificate chain digests, a certificate message (CERTIFICATE) which transmits a certificate chain, a challenge response message (CHALLENGE_AUTH), and an error message (ERROR).

* * * * *